United States Patent [19]

Sasaki et al.

[11] Patent Number: 5,493,554
[45] Date of Patent: Feb. 20, 1996

[54] 2-LASER OPTICAL HEAD AND RECORDING/REPRODUCING APPARATUS

[75] Inventors: Tooru Sasaki, Yokohama; Kunikazu Ohnishi, Yokosuka; Yasuo Kitada, Odawara; Masayuki Inoue, Yokohama, all of Japan

[73] Assignee: Hitachi, Ltd., Tokyo, Japan

[21] Appl. No.: 138,681

[22] Filed: Oct. 18, 1993

[30]   Foreign Application Priority Data

Oct. 20, 1992   [JP]   Japan ................................. 4-281873

[51] Int. Cl.$^6$ ........................................ G11B 7/12
[52] U.S. Cl. .................. 369/110; 369/44.37; 369/44.38; 369/44.23
[58] Field of Search .................. 369/110, 44.14, 369/44.23, 44.32, 44.38, 116, 120, 121, 13

[56]   References Cited

U.S. PATENT DOCUMENTS

| | | | |
|---|---|---|---|
| 4,502,762 | 3/1985 | Anderson | 369/44.37 |
| 4,621,353 | 11/1986 | Hazel et al. | 369/121 |
| 4,680,745 | 7/1987 | Ota et al. | 369/116 |
| 4,700,336 | 10/1987 | Yoshida et al. | 369/44.38 |
| 4,841,514 | 6/1989 | Tsuboi et al. | 369/44.37 |
| 5,068,843 | 11/1991 | Takeshita et al. | 369/44.37 |
| 5,070,494 | 12/1991 | Emoto et al. | 369/112 |
| 5,249,171 | 9/1993 | Matsubayashi et al. | 369/13 |
| 5,295,125 | 3/1994 | Oonishi et al. | 369/44.37 |

OTHER PUBLICATIONS

"3–Beam Overwritable Magneto–Optic Disk Drive", Watabe, et al.

Primary Examiner—Tan T. Nguyen
Attorney, Agent, or Firm—Kenyon & Kenyon

[57]   ABSTRACT

A 2-laser optical head in which the number of optical parts is small and an arrangement is also simple and a whole optical system can be miniaturized. As a construction to realize the 2-laser optical head, there is a construction in a 2-laser optical head comprising at least: semiconductor laser devices for rewriting and reproducing; a beam splitter for transmitting a laser beam emitted from the reproducing semiconductor laser device and for reflecting a laser beam emitted from the rewriting semiconductor laser device; an objective lens for converging the laser beams and irradiating onto a recording surface of a magneto-optic disk, thereby forming a spot for reproduction and a spot for rewriting; a detection optical system for detecting a reflected light from the recording surface of the spot; and a detection optical system for detecting a reflected light from the recording surface of the spot, wherein a dichroism beam splitter is arranged in a manner such that the angles between normal vectors of incident surfaces and incident optical axes and are equal to 45°, and the occurrence of a phase difference which causes a deterioration of a deflecting state is corrected by a beam splitter.

9 Claims, 16 Drawing Sheets

2-LASER OPTICAL HEAD AND RECORDING/REPRODUCING APPARATUS

BACKGROUND OF THE INVENTION

The invention relates to a 2-laser optical head having at least a semiconductor laser device for recording, a semiconductor laser device for reproduction, a beam splitter for separating and combining two light beams emitted from the semiconductor laser devices, and one objective lens and, more particularly, to a recording/reproducing apparatus using a construction which satisfies a light-using ratio and polarizing characteristics which is necessary for an optical head and is used for separating and combining a light beam for recording and a light beam for reproduction and a 2-laser optical head using the same.

FIG. 2 is a constructional diagram showing a conventional 2-laser optical head. The 2-laser optical head in FIG. 2 is constructed in a manner such that an optical system 300 using a semiconductor laser device 6 of a long oscillation wavelength $\lambda_2$ (for example, $\lambda_2$=780 nm) is used for rewriting an information signal, an optical system 301 using a semiconductor laser device 1 of a short oscillation wavelength $\lambda_1$ (for example, $\lambda_1$=680 nm) is used for reproducing an information signal, and a spot 25 for rewriting is located on the same track 5b on a magneto-optic disk 5 as an information recording medium so as to be preceding to a spot 26 for reproduction by only a predetermined interval. In the 2-laser optical head mentioned above, a dichroism beam splitter 3 for separating and combining laser beams emitted from the optical system 300 for rewriting and the optical system 301 for reproduction needs to keep a light using ratio (the light of the wavelength $\lambda_1$ is transmitted and the light of the wavelength $\lambda_2$ is reflected) and to satisfy polarizing characteristics. In an optical head (reproducing optical system 301 in the 2-laser optical head) for reproducing information from a magneto-optic disk 5, a phase difference (phase difference between the P polarization light and the S polarization light) which deteriorates a polarizing state becomes a cause to deteriorate the quality of information signal. It is, therefore, necessary to suppress the phase difference of the optical head to a predetermined value or less. The value of such a phase difference cannot unconditionally be specified due to a performance which is required from the optical disk system to the optical head. However, it is generally required to set the phase difference of the optical head to a value less than 30° to 10°. When it is now assumed, accordingly, that the phase difference which is severely required for the reproducing optical system 301 of the 2-laser optical head is set to 10 degrees or less, it is necessary that a phase difference $\delta_1$ of the dichroism beam splitter 3 as one of the optical parts which construct the 2-laser optical head is set to be 5° or less.

FIG. 3 is a diagram showing the phase difference $\delta_1$ of the dichroism beam splitter 3 and the angle dependency of an incident light beam. An axis of abscissa denotes the wavelength $\lambda_1$ and an axis of ordinate indicates the phase difference $\delta_1$. As will be understood from the diagram, the incident angle of 45° which is generally used doesn't satisfy the specification ($\delta_1 \leq |5°|$) of the phase difference in the wavelength which is used (within a range of ±20 nm for the center wavelength of 680 nm). Therefore, in case of using the dichroism beam splitter, it is necessary to set the incident angle to 10° which satisfies the specification of the phase difference.

A construction of the 2-laser optical head of the conventional example will now be described in detail hereinbelow.

A light beam 100 emitted from the semiconductor laser device 1 (wavelength $\lambda_1$) is transmitted through a beam splitter 2 and passes through the dichroism beam splitter 3 having wavelength selectivity. An incident angle (relative angle between a normal vector 3a and the incident light beam 101) of the incident light beam 101 to the dichroism beam splitter 3 is equal to 10° smaller than 45°. A light beam 102 which was transmitted through the dichroism beam splitter 3 is reflected by a mirror 15 and, after that, is irradiated as a spot 26 for reproduction onto the track 5b of the magneto-optic disk 5 as an (magneto-optical information recording medium by an objective lens 4. A reflection light beam 103 from the disk 5 passes through the objective lens 4 and the mirror 15 and is transmitted through the dichroism beam splitter 3 and is reflected by the beam splitter 2. After that, the reflected light enters a detection optical system 50. On the other hand, a light beam 104 emitted from the semiconductor laser device 6 (wavelength $\lambda_2$) is transmitted through a beam splitter 7. A transmission light beam 105 enters the dichroism beam splitter 3 at the same incident angle 10° as that of the light beam 101. Therefore, after the light beam 105 was reflected by the dichroism beam splitter 3 in the same direction as that of the light beam 102, it is irradiated onto the track 5b of the disk 5 as a spot 25 for recording (rewriting) by the objective lens 4. A reflection light beam 106 passes through the objective lens 4 and the mirror 15 and is again reflected by the dichroism beam splitter 3 and is, further, reflected by the beam splitter 7. After that, the reflected light beam enters a detection optical system 51.

As another prior art, there is "Three-beam Overwritable magneto-optic disk drive" published in "Optical Data Storage", SPIE (The International Society for Optical Engineering), Vol. 1499, 1991. According to such a technique published, the dichroism beam splitter 3 is used while setting the incident angle to 10° and an angle between the incident light beam 101 and the light beam 105 is set to 160° and, in the above construction, by using a reflecting member, the optical parts in the optical system 301 using the semiconductor laser device 1 and the optical system 300 using the semiconductor laser device 6 are vertically or horizontally arranged, and the dichroism beam splitter 3 is arranged in substantially the same manner as the optical system which is used while setting the incident angle to 45°.

However, in the 2-laser optical head according to the former conventional technique (FIG. 2), the angle between the light beams 101 and 105 which enter the dichroism beam splitter 3 is set to 160° instead of 90°. Consequently, the arrangement of the optical parts of the optical system 301 using the semiconductor laser device 1 and the optical system 300 using the semiconductor laser device 6 becomes complicated and the whole optical system also increases in size. According to the latter conventional technique, the reflecting part to bend the optical path is necessary, the number of optical parts increases, and the costs of the optical head are inevitably high.

SUMMARY OF THE INVENTION

The invention is made in consideration of the above circumstances. It is an object of the invention to provide a 2-laser optical head in which the number of optical parts is small and an arrangement is simple and the while optical system can be constructed by a small size and also to provide a recording/reproducing apparatus using such a head.

The above object is accomplished by a 2-laser optical head comprising: first and second optical systems in which lights are emitted from first and second semiconductor lasers and led to the information recording medium side and the reflection lights from a recording surface of the irradiated lights are respectively detected through first and second detecting means; a beam splitter for separating and combining the lights of the two optical systems; and an objective lens for converging the first and second laser beams emitted from the first and second semiconductor lasers and irradiating onto the recording surface of the information recording medium, thereby forming first and second spots, respectively, wherein optical correcting means for correcting a phase difference of the beam splitter is provided. In this case, the beam splitter is arranged in a manner such that angles between the normal vector of the beam splitter and incident optical axes of the first and second laser beams are substantially set to 45°, respectively. It is preferable that the above first and second optical systems and a third optical system including the beam splitter are provided on at least two independent optical bases.

The operation according to the construction as mentioned above will now be described with reference to FIG. 4.

In FIG. 4, the component elements which can be regarded to be identical to those shown in FIG. 2 are designated by the same reference numerals and their overlapped descriptions are properly omitted.

The light beam 100 emitted from the semiconductor laser device 1 (wavelength $\lambda_1$) is transmitted through a beam splitter 8 as light beam separating means and passes through a dichroism beam splitter 9 having wavelength selectivity. An incident angle (relative angle between a normal vector 9a and the incident light beam 101) of the incident light beam 101 into the dichroism beam splitter 9 is set to 45°. The light beam 102 which was transmitted through the dichroism beam splitter 9 is reflected by the mirror 15 and, after that, it is irradiated as a reproducing spot 26 onto the track 5b of the disk 5 by the objective lens 4. The reflection light beam 103 from the disk 5 passes through the objective lens 4 and the mirror 15 and is transmitted through the dichroism beam splitter 9 and is reflected by the beam splitter 8. After that, the reflected light is led to the detection optical system 50 and enters a photodetector 52.

In the above construction, as shown in FIG. 5, there is an opposite relation for the wavelength between the phase difference $\delta_2$ which occurs upon reflection by the beam splitter 8 and the phase difference $\delta_1$ which occurs by the dichroism beam splitter 9. That is, those phase differences at the center wavelength of 680 nm are equal to almost 0. When one ($\delta_1$) of them is large, the other ($\delta_2$) is small. The apparatus are designed so that the sum ($\delta_1+\delta_2$) is equal to or less than a specification value (±5°). Consequently, the phase difference $\delta_1$ which occurs by the dichroism beam splitter 9 is set off. The occurrence of the phase differences which are caused by setting the incident angle into the dichroism beam splitter 9 into 45° is corrected.

On the other hand, the light beam 104 emitted from the semiconductor laser device 6 (wavelength $\lambda_2$) is transmitted through the beam splitter 7 as light beam separating means. The transmission light 105 is reflected by the dichroism beam splitter 9 in which an angle between the normal vector 9a of an incident surface 9b and the incident light beam 105 (incident optical axis) is equal to 45°. The reflection light beam 106 progresses in the same direction as the light beam 102 and is reflected by the mirror 15 and, after that, is irradiated as a rewriting spot 25 onto the track 5b of the disk 5 by the objective lens 4. A reflection light beam 107 from the disk 5 passes through the objective lens 4 and the mirror 15 and is again reflected by the dichroism beam splitter 9 and is further reflected by the beam splitter 7 and is led to the detection optical system 51. After that, the reflected light enters a photodetector 53.

As described above, the dichroism beam splitter 9 is arranged in a manner such that the angles between the normal vectors 9a of the incident surfaces 9b and 9c and the incident optical axes 105 and 101 are equal to 45°. The occurrence of the phase differences which cause a deterioration of the polarizing state of the dichroism beam splitter 9 in association with such an arrangement is corrected by the optical parts in the optical path from the objective lens 4 of the reproducing optical system 301 to the photodetector 52, namely, by using the beam splitter 8 serving as optical correcting means. Due to this, in the 2-laser optical head, the angle between the light beams 101 and 105 which enter the dichroism beam splitter 9 and the 2-laser optical head can be set to 90°. Consequently, the arrangement of the optical parts of the optical system 301 using the semiconductor laser device 1 and the optical system 300 using the semiconductor laser device 6 is simplified and the optical head can be miniaturized.

By providing the optical systems onto the independent optical bases as mentioned above, the optical axes can be easily adjusted by relatively moving the positions of the optical bases.

DESCRIPTION OF THE PREFERRED EMBODIMENTS

Figure 1:
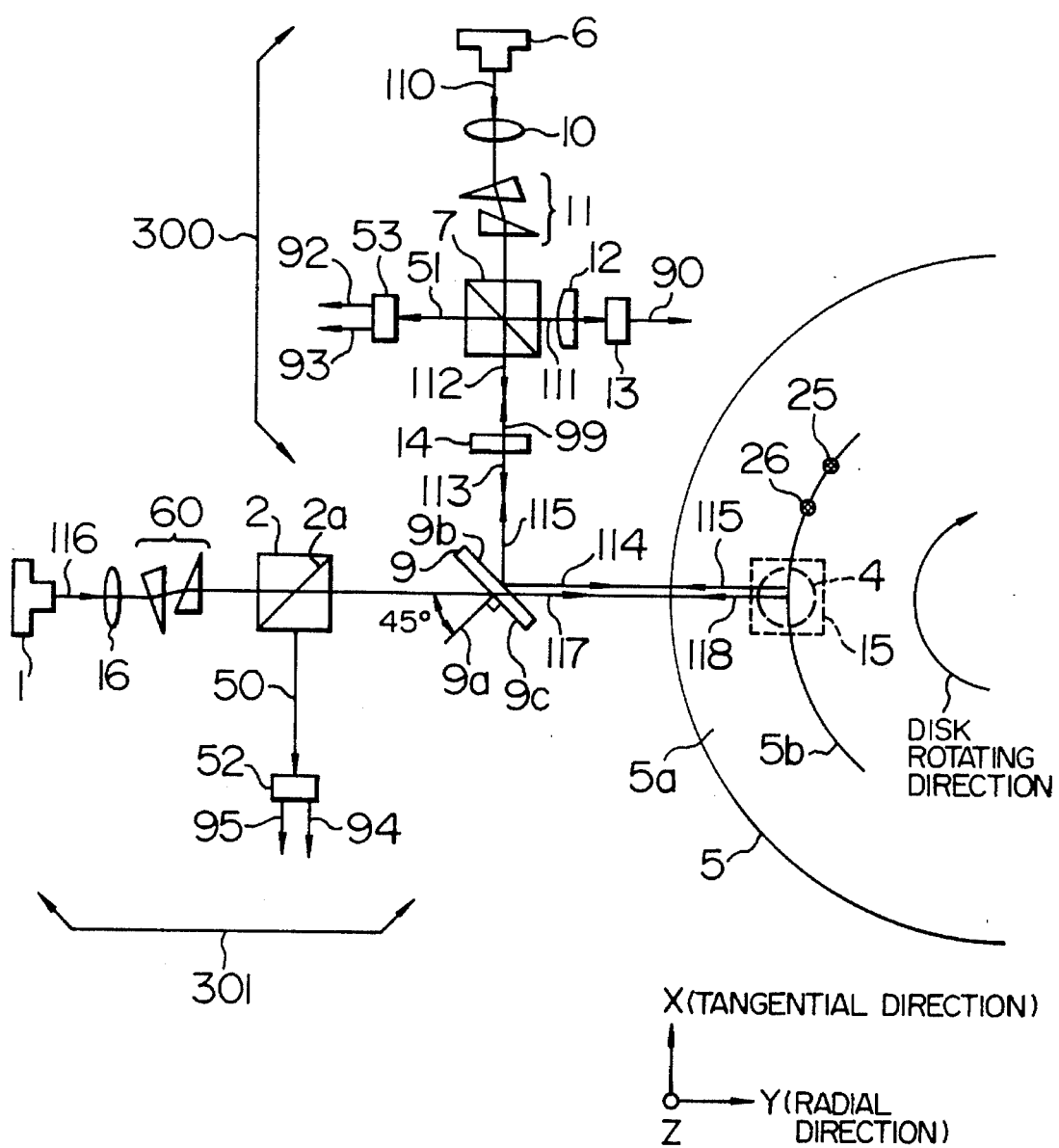
FIG. 1 is a constructional diagram showing the first embodiment of the invention.
Figure 2:
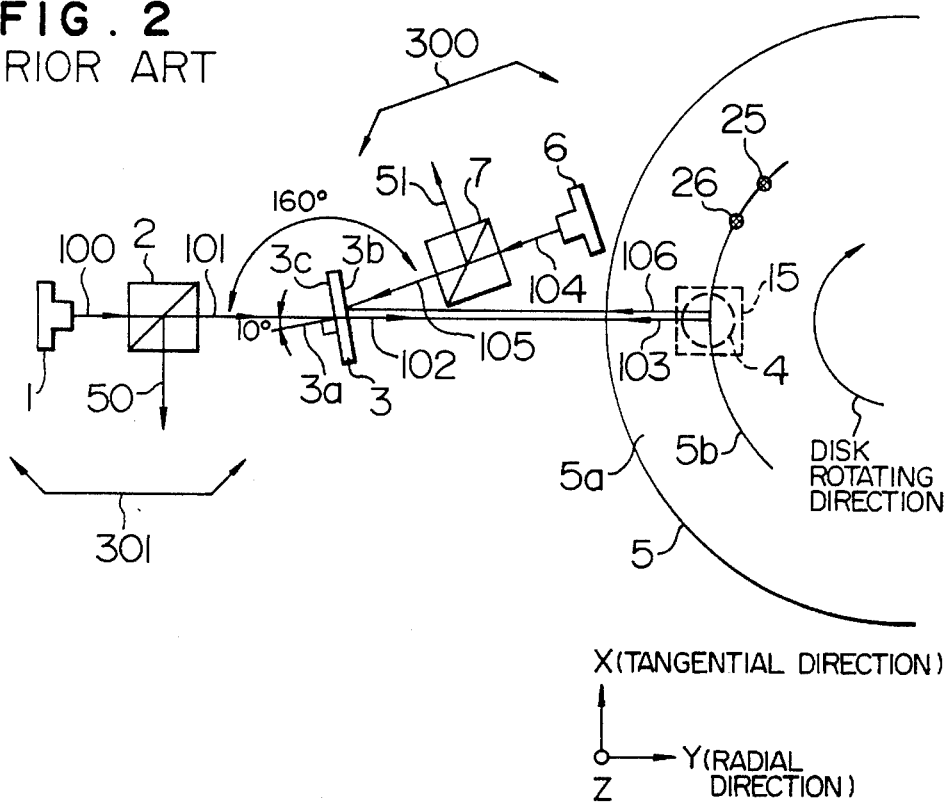
FIG. 2 is a constructional diagram of a conventional 2-laser optical head.
Figure 3:
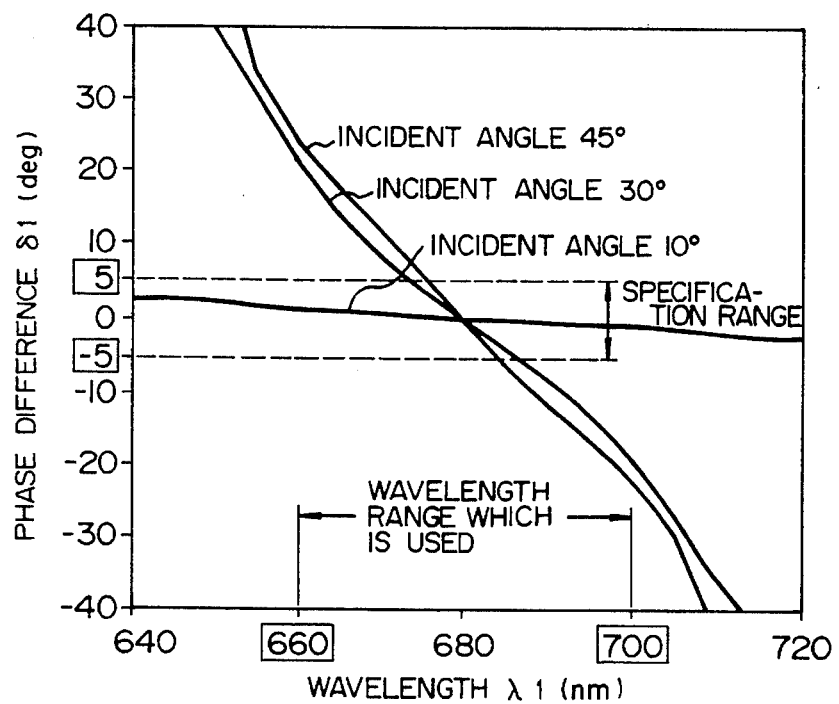
FIG. 3 is a diagram showing a phase difference of a dichroism beam splitter and an incident angle dependency.
Figure 4:
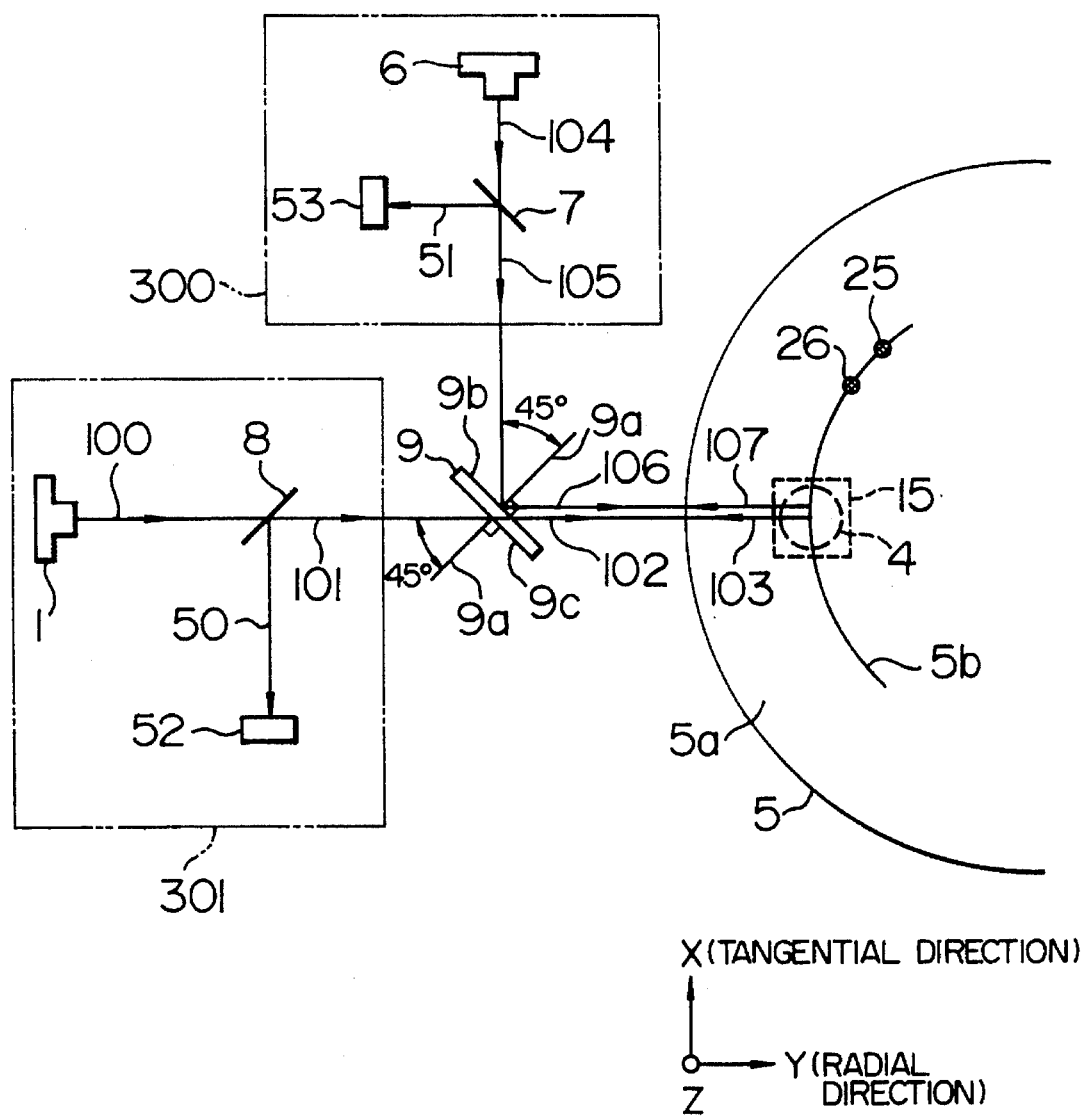
FIG. 4 is a diagram for explaining the operation of the invention.

As embodiment of a 2-laser optical head of the invention will now be described in detail hereinbelow with reference to the drawings. In the following description, the component elements which can be regarded to be identical to those described in FIGS. 2 to 5 are designated by the same reference numerals and their overlapped descriptions are properly omitted here.

FIG. 1 is a constructional diagram showing the first embodiment of a 2-laser optical head of the invention.

The 2-laser optical head according to the first embodiment is constructed in a manner such that the optical system 300 using the semiconductor laser device 6 of a long oscillation wavelength $\lambda_2$ (for example, $\lambda_2$=780 nm) is used for rewriting an information signal and the optical system 301 using the semiconductor laser device 1 of a short oscillation wavelength $\lambda_1$ (for instance, $\lambda_1$=680 nm) is used for reproducing the information signal and the rewriting spot 25 is located on the same track 5b on the magneto-optic disk 5 serving as a magneto-optic information recording medium so as to be preceding to the reproducing spot 26 by only a predetermined interval.

In FIG. 1, the divergent light beam 110 emitted from the semiconductor laser device 6 which serves as a linear polarization light source and in which an oscillation wavelength $\lambda_2$ is equal to 780 nm is converted into the parallel light beam by a collimating lens 10. Anisotropy of intensity of the parallel light beam is corrected by beam shaping prisms 11. After that, the light beam enters the beam splitter 7 as first light beam separating means and is divided into a transmission light beam 112 and a reflection light beam 111. The beam splitter 7 has polarizing characteristics such that the reflectances and transmittances in the P polarization and S polarization respectively differ, that is, for example, a P polarization transmittance $T_p$=0.9, a P polarization reflectance $R_p$=0.1, an S polarization transmittance $T_s$=0, and an S polarization reflectance $R_s$=1. The parallel light beam 111 reflected by the beam splitter 7 is converged by a lens 12 and enters a photodetector 13. An output signal 90 of the photodetector 13 is used as a signal to control a light intensity of the semiconductor laser device 6. Since the above point is not essentially concerned with the embodiments, its detailed description is omitted.

On the other hand, the parallel beam 112 transmitted through the beam splitter 7 is converted into a circular polarization light 113 by a ¼ wavelength plate 14 and the progressing direction is deflected by 90° by the dichroism beam splitter 9 having wavelength selectivity (in the embodiment, the light of the wavelength of 780 nm is reflected and the light of the wavelength of 680 nm is transmitted). The dichroism beam splitter 9 is constructed by a parallel flat plate having parallel flat surfaces 9b and 9c and is arranged in a manner such that the angle between the normal vector 9a of the flat surface 9b (or flat surface 9c) and the incident light beam 113 is set to 45°. A light beam 114 reflected by the dichroism beam splitter 9 is converged by the objective lens 4 through the mirror 15 and is irradiated (as a spot 25) for rewriting an information signal onto the track 5b of an information recording surface 5a of the disk 5. The reflected light beam from the disk 5 is again converted into a parallel light beam 115 by the objective lens 4 and is respectively reflected by the mirror 15 and the reflecting surface 9b of the dichroism beam splitter 9. After that, since the light beam 115 is again transmitted through a ¼ wavelength plate 14, the light beam changes from the circular polarization light to a linear polarization (S polarization) light beam 99 in which the polarizing direction of the light beam 112 as a linear polarization (P polarization) light has been rotated by 90°. After the light beam 99 as an S polarization light was reflected by the beam splitter 7, it is led to the first detection optical system 51 and enters the photodetector 53.

An information signal 93 (signal such as an address signal or the like provided by a pit signal of a concave/convex shape) which has previously been formed on the disk 5 and a servo signal 92 to accurately position the spot 25 onto the information recording surface 5a are derived from the photodetector 53. In the embodiment, the optical parts (for example, in case of using an astigmatism method as a focusing error detecting method, a converging lens, a cylindrical lens, and the like) according to a detecting method of the servo signal 92 and their arrangement and circuits for producing and processing the signals after the light beam 99 entered the photodetector 53 are obviously necessary. Since they are not essentially concerned with the present invention, however, they are omitted in the diagram.

On the other hand, a light beam 116 as a divergent light 116 emitted from the semiconductor laser device 1 which serves as a linear polarization light source and in which the oscillation wavelength $\lambda_1$ is equal to 680 nm is converted into the parallel light beam by a collimating lens 16. Anisotropy of intensity of the parallel light beam is corrected by beam shaping prisms 60. After that, the light beam is transmitted through a beam splitter 2 serving as second light separating means and is subsequently transmitted through the dichroism beam splitter 9 in which the angle between the normal vector 9a of the flat surface 9c as an incident surface and the incident light beam 116 is set to 45°. The beam splitter 2 has polarizing characteristics such that the reflectances and transmittances in the P polarization and S polarization respectively differ, that is, for example, the P polarization transmittance $T_p$=0.7, the P polarization reflectance $R_p$=0.3, the S polarization transmittance $T_s$=0, and the S polarization transmittance $R_s$=1. A transmission light beam 117 progresses almost in parallel with the light beam 114 reflected by the dichroism beam splitter 9 and is converged by the objective lens 4 as an achromatic lens through the mirror 15 and is irradiated (as a spot 26) onto the track 5b on the information recording surface 5a of the disk 5. The reflected light beam from the disk 5 is again converted into a parallel light beam 118 by the objective lens 4 and is reflected by the mirror 15. After that, the reflected light is transmitted through the dichroism beam splitter 9 and is, further, reflected by a reflecting surface 2a of the beam splitter 2 and is led to the second detection optical system 50 and enters the photodetector 52. An information signal 94 as a magneto-optic signal, a servo signal 95 to accurately position the spot 26 onto the information recording surface 5a, and the like are derived from the photodetector 52.

In the embodiment, the optical parts according to a detecting method of the servo signal 95 and the optical parts (analyzer and the like) according to a detecting method of the information signal 94 as a magneto-optic signal are obviously necessary. Since they are not essentially concerned with the invention, however, they are omitted in the diagram. In the embodiment, one photodetector 52 has been provided and shown for the detection optical system 50 and one photodetector 53 has been provided and shown for the detection optical system 51 in the diagram. Cases certainly exist where a plurality of photodetectors are necessary depending in on the servo signal detecting method or magneto-optic detecting method.

Figure 5:
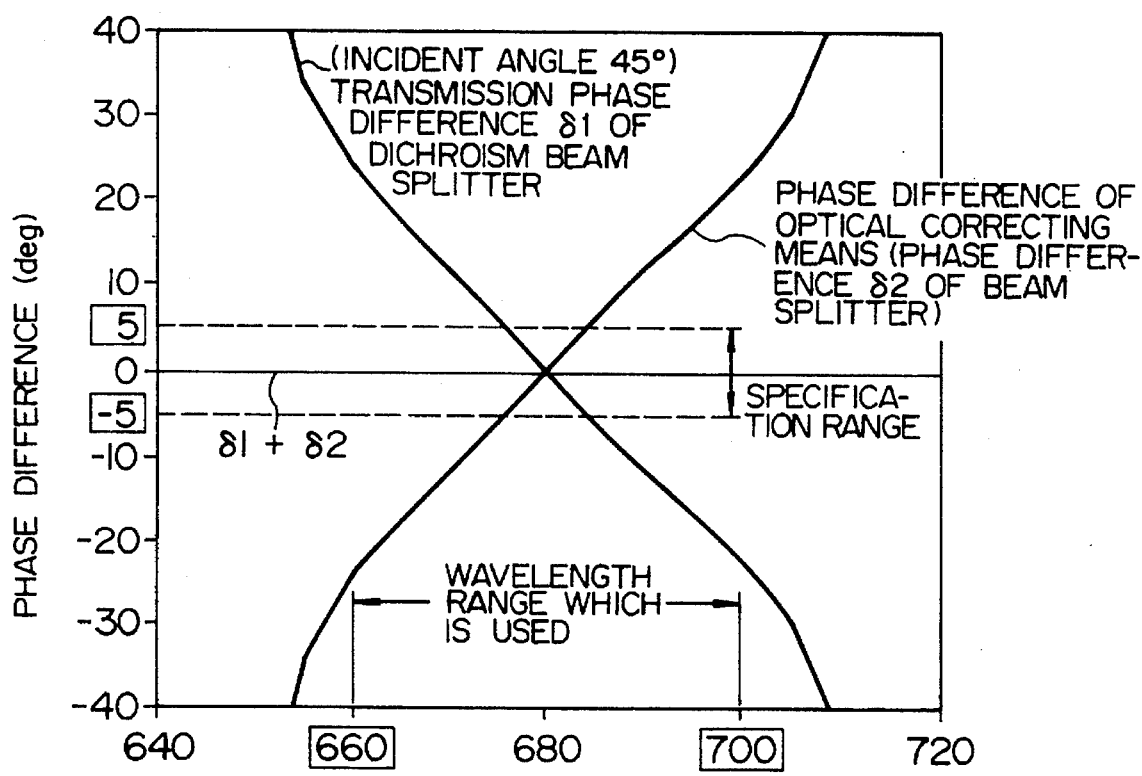
FIG. 5 is a diagram for explaining the correction of the phase difference of a dichroism beam splitter of the invention.

In the above construction, as shown in FIG. 5, the phase difference $\delta_1$ which occurs upon transmission through the dichroism beam splitter 9 is corrected by the phase difference $\delta_2$ which occurs upon reflection by the beam splitter 2. Therefore, even in case of using the dichroism beam splitter 9 while setting the incident angle into the dichroism beam splitter 9 to 45°, an increase in phase difference is reduced and it is possible to detect without deteriorating a quality of the information signal 94 as a magneto-optic signal. Since the dichroism beam splitter 9 can be used at the incident angle of 45°, the optical axis in the optical system 300 which uses the semiconductor laser device 6 and is used to rewrite the information signal and the optical axis in the optical system 301 which uses the semiconductor laser device 1 and is used to reproduce the information signal can be constructed perpendicularly or in parallel. The arrangement of the optical parts of the optical head can be simplified.

In the 2-laser optical head in the embodiment, the phase difference $\delta_1$ which occurs upon transmission in the dichroism beam splitter 9 is corrected by the phase difference $\delta_2$ which occurs upon reflection of the beam splitter 2 as light beam separating means for separating the reflection light beam from the disk 5 into the lights of the detection optical systems. The invention, however, is not limited to the above construction.

Figure 6:
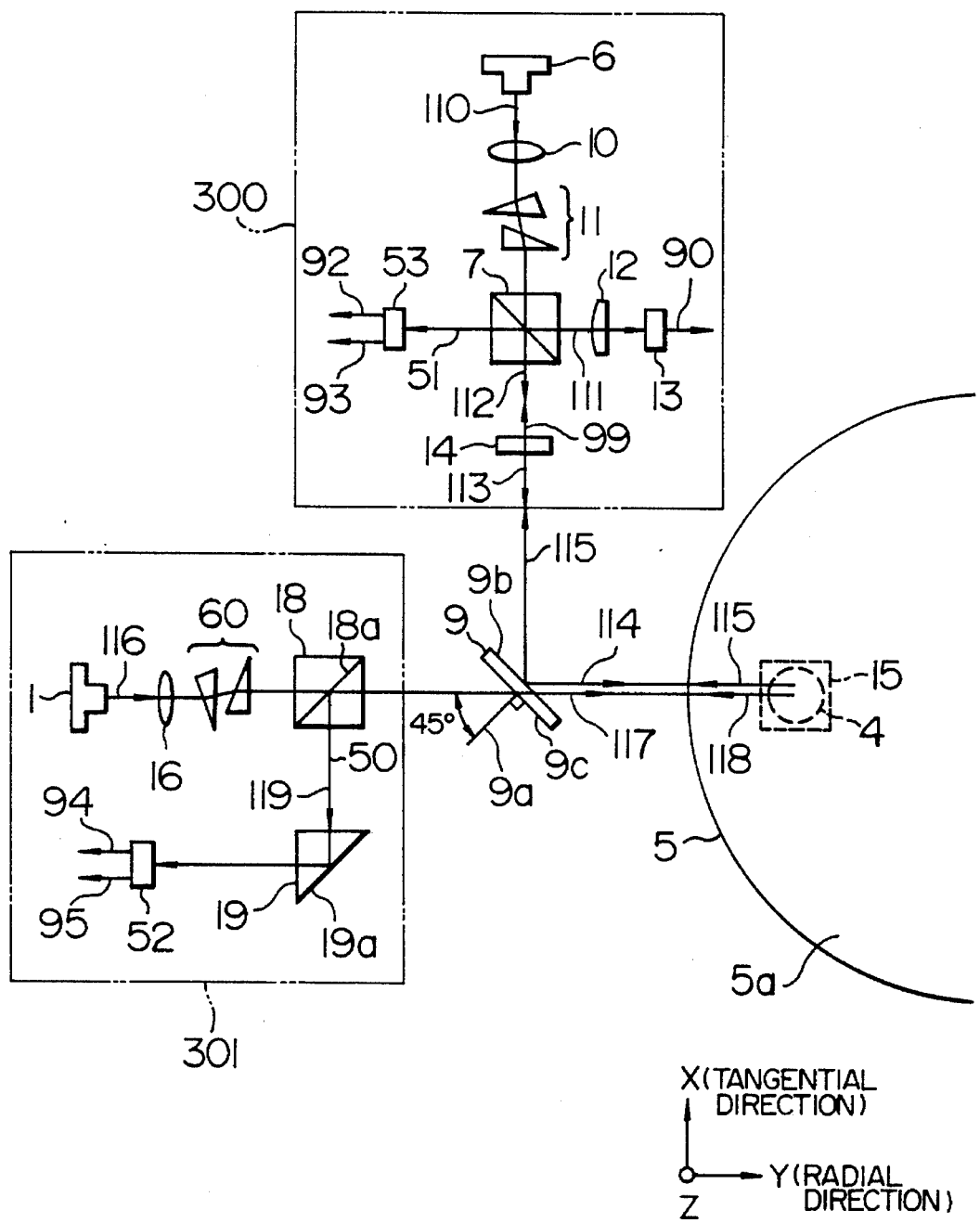
FIG. 6 is a constructional diagram showing the second embodiment of the invention.

The second embodiment of the invention is shown in FIG. 6. A 2-laser optical head of the embodiment has a construction such that optical parts provided in an optical path of a detection optical system are used as correcting means for correcting a phase difference of the dichroism beam splitter 9. In FIG. 6, the same component elements as those in FIG. 1 are designated by the same reference numerals. Since the optical system 300 using the semiconductor laser device 6 is similar to that in the first embodiment, its description is omitted here.

In FIG. 6, the light beam 116 as a divergent light emitted from the semiconductor laser device 1 which serves as a linear polarization light source and in which the oscillation wavelength $\lambda_1$ is equal to 680 nm is converted into the parallel light beam by the collimating lens 16. Anisotropy of an intensity of the parallel light beam is corrected by the beam shaping prisms 60 and is subsequently transmitted through a beam splitter 18 as light beam separating means. After that, the light beam is transmitted through the dichroism beam splitter 9 in which the angle between the normal vector 9a of the flat surface 9c as an incident surface and the incident light beam 116 is set to 45°. The beam splitter 18 has polarizing characteristics such that reflectances and transmittances in the P polarization and the S polarization respectively differ, that is, for example, the P polarization transmittance $T_p=0.7$, the P polarization reflectance $R_p=0.3$, the S polarization transmittance $T_s=0$, the S polarization reflectance $R_s=1$. The transmission light beam 117 progresses almost in parallel with the light beam 114 reflected by the dichroism beam splitter 9 and is converged by the objective lens 4 as an achromatic lens through the mirror 15 and is irradiated (as a spot 26) onto the information recording surface 5a of the disk 5 as a magneto-optic information recording medium.

The reflected light beam from the disk 5 is again converted into the parallel light beam 118 by the objective lens 4 and is reflected by the mirror 15. After that, the reflected light beam is transmitted through the dichroism beam splitter 9 and is further reflected by a reflecting surface 18a of the beam splitter 18 and is led to the detection optical system 50. A light beam 119 led to the detection optical system is reflected by a reflecting surface 19a of a total reflecting mirror 19 and enters the photodetector 52 after that. The information signal 94 as a magneto-optic signal, the servo signal 95, and the like are derived from the photodetector 52. Since a method of obtaining those signals is not essentially concerned with the invention, its detailed description is omitted here.

In the first embodiment, the phase difference $\delta_1$ which occurs upon transmission of the dichroism beam splitter 9 has been corrected by the phase difference $\delta_2$ which occurs upon reflection of the beam splitter 2. In the second embodiment, however, the phase difference $\delta_1$ is corrected by a phase difference $\delta_3$ which occurs by the reflection by the reflecting surface 19a of the mirror 19 in stead of $\delta_2$.

Consequently, even in case of using the dichroism beam splitter 9 while setting the incident angle into the dichroism beam splitter 9 to 45°, an increase in phase difference is reduced and the information signal 94 as a magneto-optic signal can be detected without deteriorating the quality thereof. On the other hand, since the dichroism beam splitter 9 can be used at the incident angle of 45°, the optical axis in the optical system 300 which uses the semiconductor laser device 6 and is used for rewriting the information signal and the optical axis in the optical system 301 which uses the semiconductor laser device 1 and is used for reproducing the information signal can be constructed perpendicularly or in parallel with each other, so that the optical head can be easily manufactured and the size and costs can be reduced.

In the 2-laser optical head in the second embodiment, the phase difference $\delta_1$ which occurs upon transmission of the dichroism beam splitter 9 has been corrected by the phase difference $\delta_3$ which occurs upon reflection of the mirror 19 as an optical part provided in the optical path of the detection optical system. However, the invention is not limited to such a construction.

Figure 7:
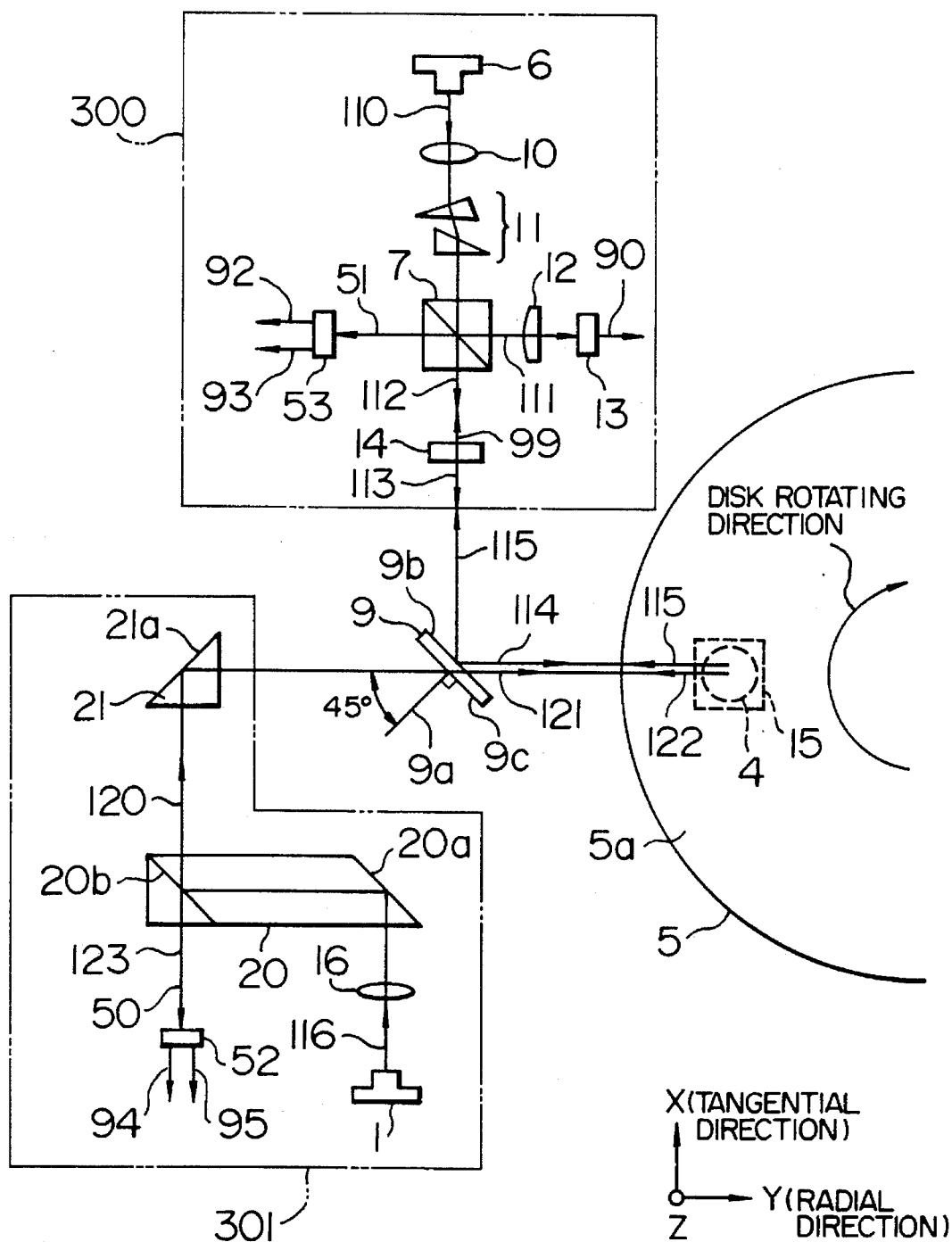
FIG. 7 is a constructional diagram showing the third embodiment of the invention.

FIG. 7 shows the third embodiment of the invention. A 2-laser optical head of the embodiment has a construction such that optical parts provided in a reciprocating optical path of the dichroism beam splitter 9 and the light beam separating means (in the embodiment, a beam splitter 20) for separating the reflected light beam from the disk 5 into detection optical systems are used as optical correcting means for correcting the phase difference $\delta_1$ of the dichroism beam splitter 9. In FIG. 7, the same component elements as those shown in FIG. 1 are designated by the same reference numerals. Since the optical system 300 using the semiconductor laser device 6 is similar to that in the first embodiment, its detailed description is omitted here.

The light beam 116 as a divergent light emitted from the semiconductor laser device 1 which serves as a linear polarization light source and in which the oscillation wavelength $\lambda_1$ is equal to 680 nm is converted into the parallel light beam by the collimating lens 16 and enters the beam splitter 20 as an optical part in which the optical path deflecting means and the light beam separating means are combined. The light beam 116 is reflected by a reflecting surface 20a of the beam splitter 20 and is again reflected by a beam splitter surface 20b. The beam splitter surface 20b has polarizing characteristics such that reflectances and transmittances in the P polarization and the S polarization respectively differs, that is, for example, the P polarization transmittance $T_p=1.0$, the P polarization reflectance $R_p=0$, the S polarization transmittance $T_s=0.3$, and the S polarization reflectance $R_s=0.7$. A light beam 120 emitted from the beam splitter 20 is reflected by a reflecting surface 21a of a total reflecting mirror 21 and, after that, is transmitted through the dichroism beam splitter 9 provided in a manner such that the angle between the normal vector 9a of the flat surface 9c as an incident surface and the incident light beam 120 is set to 45°. A transmission light beam 121 progresses almost in parallel with the light beam 114 reflected by the dichroism beam splitter 9 and is converged by the objective lens 4 as an achromatic lens through the mirror 15 and is irradiated (as a spot 26) onto the information recording surface 5a of the disk 5.

The reflected light beam from the disk 5 is again converted into a parallel light beam 122 by the objective lens 4 and is reflected by the mirror 15. After that, the reflected light beam is transmitted through the dichroism beam splitter 9 and is further reflected by the reflecting surface 21a of the mirror 21 and is subsequently transmitted through the beam splitter 20 and is led to the detection optical system 50 and enters the photodetector 52 as a light beam 123. The information signal 94 as a magneto-optic signal, the servo signal 95, and the like are derived from the photodetector 52. Since a method of obtaining those signals is not essentially concerned with the invention, its detailed description is omitted here.

In the above construction, the phase difference $\delta_1$ which occurs upon transmission through the dichroism beam splitter 9 in the first embodiment is corrected by a phase difference $\delta_4$ which occurs due to the reflection by the reflecting surface 21a of the total reflecting mirror 21.

Figure 8:
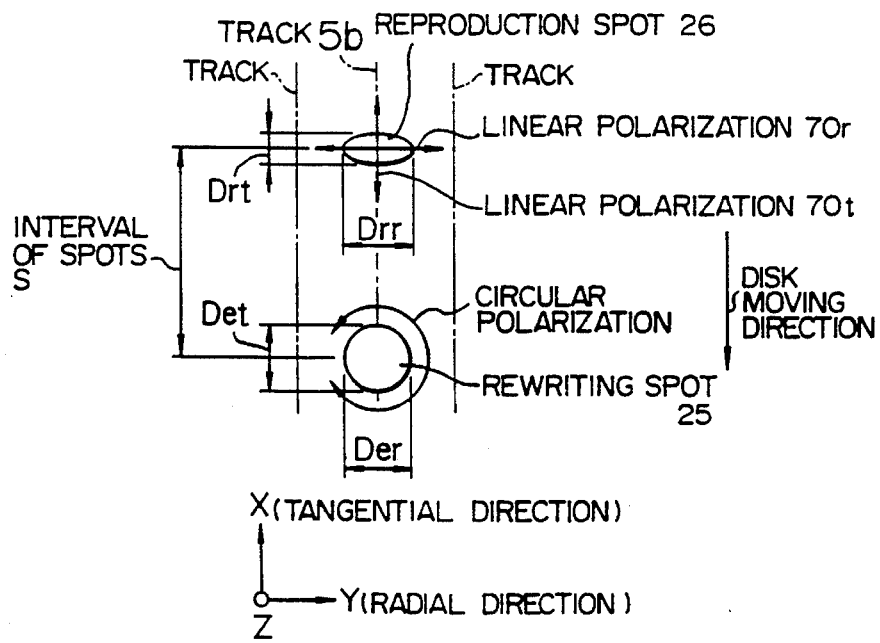
FIG. 8 is an explanatory diagram of a spot which is formed on a disk.

FIG. 8 shows a state of a spot on the disk 5 according to the 2-laser optical head of the embodiment. The rewriting spot 25 and the reproducing spot 26 are irradiated onto a track 5b of the disk 5. The spot 25 is irradiated to the position that is preceding to the spot 26 by a predetermined interval (spot interval S). The above relation shall also apply in the first and second embodiments. To assure rewriting characteristics of the information signal 94, anisotropy of an intensity emitted from the semiconductor laser device 6 is corrected by using the beam shaping prisms 11, thereby forming a spot of an intensity of an almost true circle as a rewriting spot 25. In the embodiment, a size $D_e$ (intensity value of ½ of the peak intensity) of spot is set such that $D_{et} \approx 0.79$ μm and $D_{er} \approx 0.79$ μm and a spot shape is an almost true circle. Optical constants in this instance are set such that $NA_1$ of the objective lens 4 is equal to $NA_1=0.55$, a focal distance $f_1=3.3$ mm, a focal distance $f_2$ of the collimating lens 10 is equal to $f_2=6.2$ mm, an extent angle $\theta\perp$ (in the direction perpendicular to an active layer) of the light emission intensity (intensity value of ½ of the peak intensity) of the semiconductor laser device 6 is equal to $\theta\perp=23°$, an extent angle $\theta\|$ (direction that is parallel to the active layer) of such a light emission intensity is equal to $\theta\|=9.44°$, and a magnification m of the beam shaping prisms 11 is equal to m=2.5.

As another method of correcting the anisotropy of the light emission intensity of the semiconductor laser device 6, there is a method of reducing an effective numerical aperture $NA_e$ $(=NA_1 \times f_1/f_2)$. In the embodiment, the effective $NA_e=0.55 \times 3.3$ mm/6.2 mm $\approx 0.29$. In this method, since the light using ratio decreases, it is required that an output of the semiconductor laser device 6 which is used is high. In the embodiment, therefore, in order to assure a high light using ratio, the anisotropy of the light emission intensity of the semiconductor laser device 6 is corrected by using the beam shaping prisms 11, thereby setting the intensity of the spot 25 on the disk to an almost circle. On the other hand, to assure a high light using efficiency, the optical system 300 using the semiconductor laser device 6 uses an optical system which comprises the beam splitter 7 as light beam separating means and the ¼ wavelength plate 14 provided in the reciprocating optical path from the beam splitter 7 to the dichroism beam splitter 9. Therefore, the light beam 114 which enters the objective lens 4 is a circular polarization light and there is a relation as shown in FIG. 8 between the spot 25 and the polarization.

On the other hand, an intensity of the reproducing spot 26 in the embodiment is set to an elliptic shape. A size $D_r$ (intensity value of ½ of the peak intensity) of the spot 26 is set such that $D_{rt} \approx 0.74$ μm, $D_{rr} \approx 0.61$ μm and a spot shape is an ellipse. In this instance, optical constants are set such that the numerical aperture $NA_1$ of the objective lens 4 is equal to $NA_1=0.55$, the focal distance $f_1=3.3$ mm, the focal distance $f_2$ of the collimating lens 16 is equal to $f_2=15$ mm, the extent angle $\theta\perp$ (direction perpendicular to the active layer) of the light emission intensity (intensity value of ½ of the peak intensity) of the semiconductor laser device 1 is equal to $\theta\perp=27.2°$, and the extent angle $\theta\|$ (direction which is parallel with the active layer) of such a light emission intensity is equal to $\theta\|=7.5°$. As a method of correcting the anisotropy of the light emission intensity of the semiconductor laser device 6, the beam shaping prisms have been used in the first and second embodiments. However, in the third embodiment, by considering a point that the reproducing optical system 301 can sacrifice the light using ratio by a certain degree, a method of reducing an effective numerical aperture $NA_r$ of the collimating lens 16 as small as possible is used. The effective $NA_r$ is equal to 0.12 ($\approx 0.55 \times 3.3$ mm/15 mm). As for a relation between the intensity shape of the spot 26 and the polarizing state, there is a relation of an ellipse in which the intensity shape is long in the radial direction of the disk 5. The polarizing state is set such that the light beam 121 which enters the objective lens 4 is a linear polarization (S polarization) and is a linear polarization 70r in the radial direction on the disk 5. In the embodiment, the ellipse of the intensity of the spot 26 is set such that a diameter of the ellipse in the radial direction of the disk 5 is long from a viewpoint of the reproducing characteristics. Due to this, the polarization is set to the linear polarization 70r in the radial direction of the disk 5. The invention, however, is not limited to such a polarization. By turning the direction of the polarization of the light beam 121 to the objective lens 4 by 90° by using a ½ wavelength plate or the like, a linear polarization 70t in the tangential direction of the disk 5 can be set while setting the ellipse of the intensity of the spot 26 in a manner such that the ellipse is long in the tangential direction of the disk 5. It is sufficient to provide the ½ wavelength plate into the reciprocating optical path from the beam splitter 20 to the disk 5. Factually, when considering an influence on the laser light beam ($\lambda_2$) of the semiconductor laser device 6, for example, the ½ wavelength plate is arranged in the reciprocating optical path from the total reflecting mirror 21 and the dichroism beam splitter 9 in case of the optical head of the embodiment.

Figure 9:
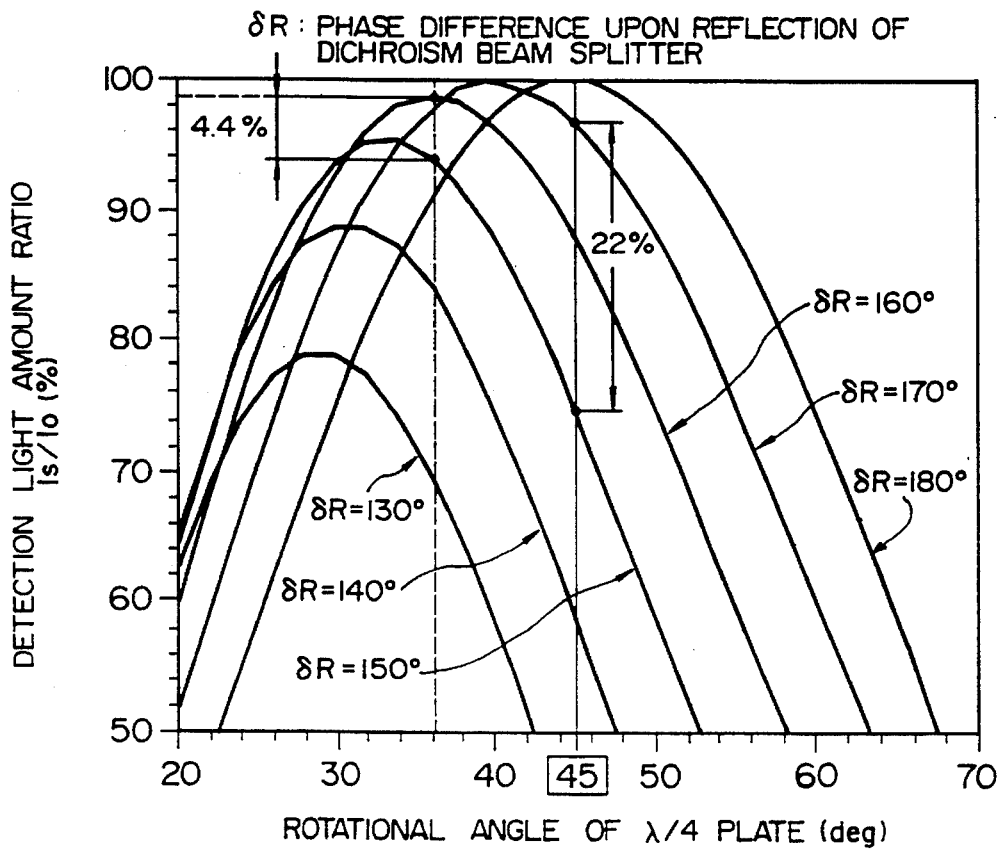
FIG. 9 is an explanatory diagram of an effect of the correction by a wavelength plate.

An embodiment of the correction of a phase difference $\delta_R$ which occurs upon reflection of the dichroism beam splitter 9 will now be described hereinbelow with reference to the 2-laser optical head (FIG. 7) of the third embodiment and FIG. 9. FIG. 9 shows the relation of a detection light amount ratio $I_s/I_o$ (axis of ordinate) to the rotational angle of the ¼ wavelength plate (axis of abscissa). The rotational angle of the ¼ wavelength plate 14 indicates the direction of the optical axis. The linear polarization (P polarization) 112 is the circular polarization 113 at the rotational angle of 45°. The detection light amount ratio is equal to the ratio ($=I_s/I_o$) of a light amount $I_s$ of the light which enters the detection optical system 51 to a light amount $I_o$ of the light beam 112 which goes out from the beam splitter 7. On calculation, it is assumed that there is no light amount loss and no phase difference in each optical part and disk.

In case of using the dichroism beam splitter 9 while setting the incident angle to 45° as in the invention, when considering a design error or the like, the phase difference $\delta_R$ which occurs upon reflection of the dichroism beam splitter 9 is estimated to 150° to 170° in a using wavelength range of 780 nm±20 nm. In the case where such a phase difference occurs, when the rotational angle of the ¼ wavelength plate 14 is equal to 45°, a fluctuation of 22% of the detection light amount ratio occurs. On the other hand, when the rotational angle is set to 36°, the fluctuation can be reduced to 4.4%. As described above, by adjusting the optical axis of the ¼ wavelength plate 14, the fluctuation of the detection light amount which is caused by the phase difference $\delta_R$ which occurs upon reflection by the dichroism beam splitter 9 can be reduced.

In the 2-laser optical head of the embodiment, the phase difference $\delta_1$ which occurs upon transmission through the dichroism beam splitter 9 has been corrected by the phase difference $\delta_4$ which occurs upon reflection by the mirror 21 as an optical part provided in the reciprocating optical path from the dichroism beam splitter 9 to the beam splitter 20 as light separating means for separating the reflected light beam from the disk 5 into the detection optical systems. The phase difference $\delta_R$ which occurs upon reflection by the dichroism bean splitter 9 has been corrected by rotating the ¼ wavelength plate 14 as an optical part provided in the reciprocating optical path from the beam splitter 7 to the dichroism beam splitter 9. The invention, however, is not limited to such a correcting method.

Figure 10:
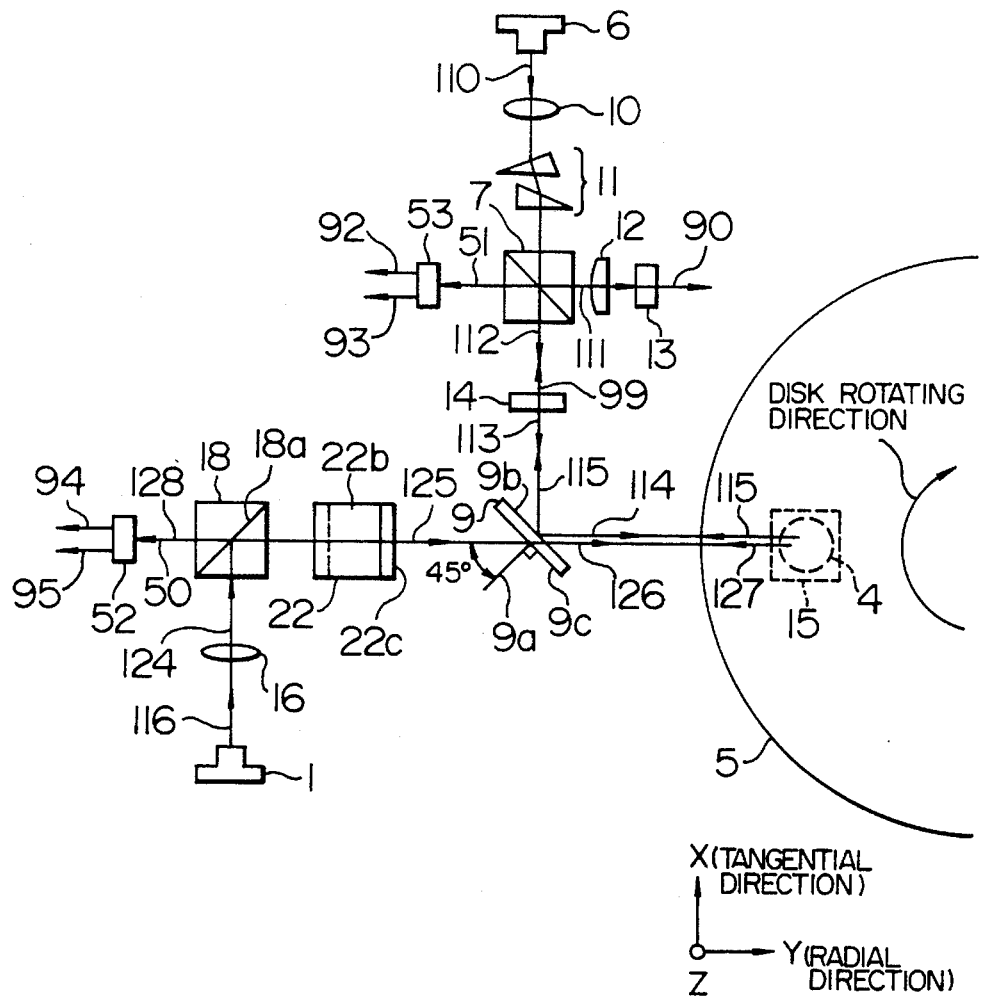
FIG. 10 is a constructional diagram showing the fourth embodiment of the invention.

FIG. 10 shows the fourth embodiment of the invention. A 2-laser optical head of the fourth embodiment relates to another embodiment of a construction using optical parts provided in the reciprocating optical path between the dichroism beam splitter 9 and the beam splitter 2 as light beam separating means for separating the reflected light beam from the disk 5 into the detection optical systems. In FIG. 10, the component elements which can be regarded as the same elements as those shown in FIG. 1 are designated by the same reference numerals. Since the optical system 300 using the semiconductor laser device 6 is substantially the same as that in each of the first to third embodiments, its detailed description is omitted here.

Figure 11:
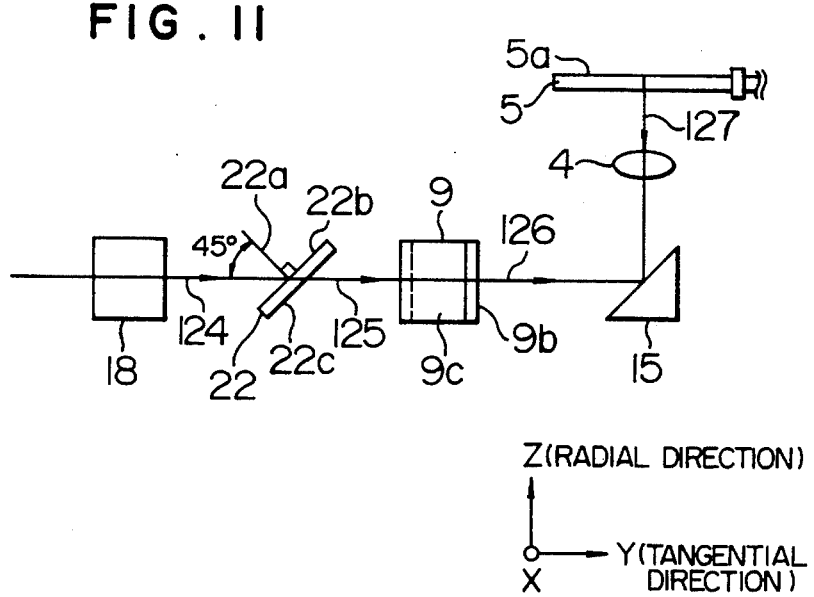
FIG. 11 is an explanatory diagram of a 2-laser optical head of the fourth embodiment.

The light beam 116 as a divergent light emitted from the semiconductor laser device 1 which serves as a linear polarization light source and in which the oscillation wavelength $\lambda_1$ is equal to 680 nm is converted into a parallel light beam 124 by the collimating lens 16 and is reflected by the reflecting surface 18a of the beam splitter 18 as light beam separating means. The light beam 124 reflected by the beam splitter 18 is transmitted through a dichroism beam splitter 22 having the same polarizing characteristics as those of the dichroism beam splitter 9. As shown in FIG. 11, the beam splitter 22 is provided in a manner such that a normal vector 22a of a flat surface 22b as an incident surface lies within a ZY plane that is perpendicular to an XY plane and the angle between the normal vector 22a and the incident light beam 124 is set to 45°. A light beam 125 which was transmitted through the dichroism beam splitter 22 is transmitted through the dichroism beam splitter 9 and becomes a light beam 126. The light beam 126 progresses in almost parallel with the light beam 114 reflected by the dichroism beam splitter 9 and is converged by the objective lens 4 as an achromatic lens through the mirror 15 and is irradiated (as a spot 26) onto the information recording surface 5a of the disk 5.

The reflected light beam from the disk 5 is again converted into a parallel light beam 127 by the objective lens 4 and is reflected by the mirror 15. After that, the reflected light beam is transmitted through the dichroism beam splitter 9 and, further, the dichroism beam splitter 22. Subsequently, the light beam passes through the beam splitter 18 and is led to the detection optical system 50 and enters the photodetector 52. The information signal 94 as a magneto-optic signal, the servo signal 95, and the like are derived from a light beam 128 which entered the photodetector 52. Since a method of obtaining those signals is not essentially concerned with the invention, its detailed description is omitted here.

In the above construction, the phase difference $\delta_1$ which occurs upon transmission of the dichroism beam splitter 9 is corrected by a phase difference $\delta_5$ which occurs when the light beam passes through the dichroism beam splitter 22 having the same polarizing characteristics as those of the dichroism beam splitter 9. Actually, in the manufacturing step, by using two dichroism beam splitters manufactured by the same lot, the dichroism beam splitters having almost the same polarizing characteristics are obtained. On the other hand, it is desirable to arrange the dichroism beam splitters 9 and 22 in a manner such that the planes including the incident light beams (light beam 124, light beam 125) and the normal vectors (22a, 9a) of the incident surfaces (22b, 9b) are perpendicular to each other (in the embodiment, the ZY plane including the incident light beam 124 and the normal vector 22a of the incident surface 22b and the XY plane including the incident light beam 125 and the normal vector 9a of the incident surface 9b) and their inclination angles are equal (in the embodiment, 45°). The dichroism beam splitter 22 can be also provided in the optical path in the detection optical system 50.

Therefore, even in case of using the dichroism beam splitter 9 while setting the incident angle to 45°, an increase in phase difference is reduced and the information signal 94 as a magneto-optic signal can be detected without deteriorating the quality thereof.

Figure 12:
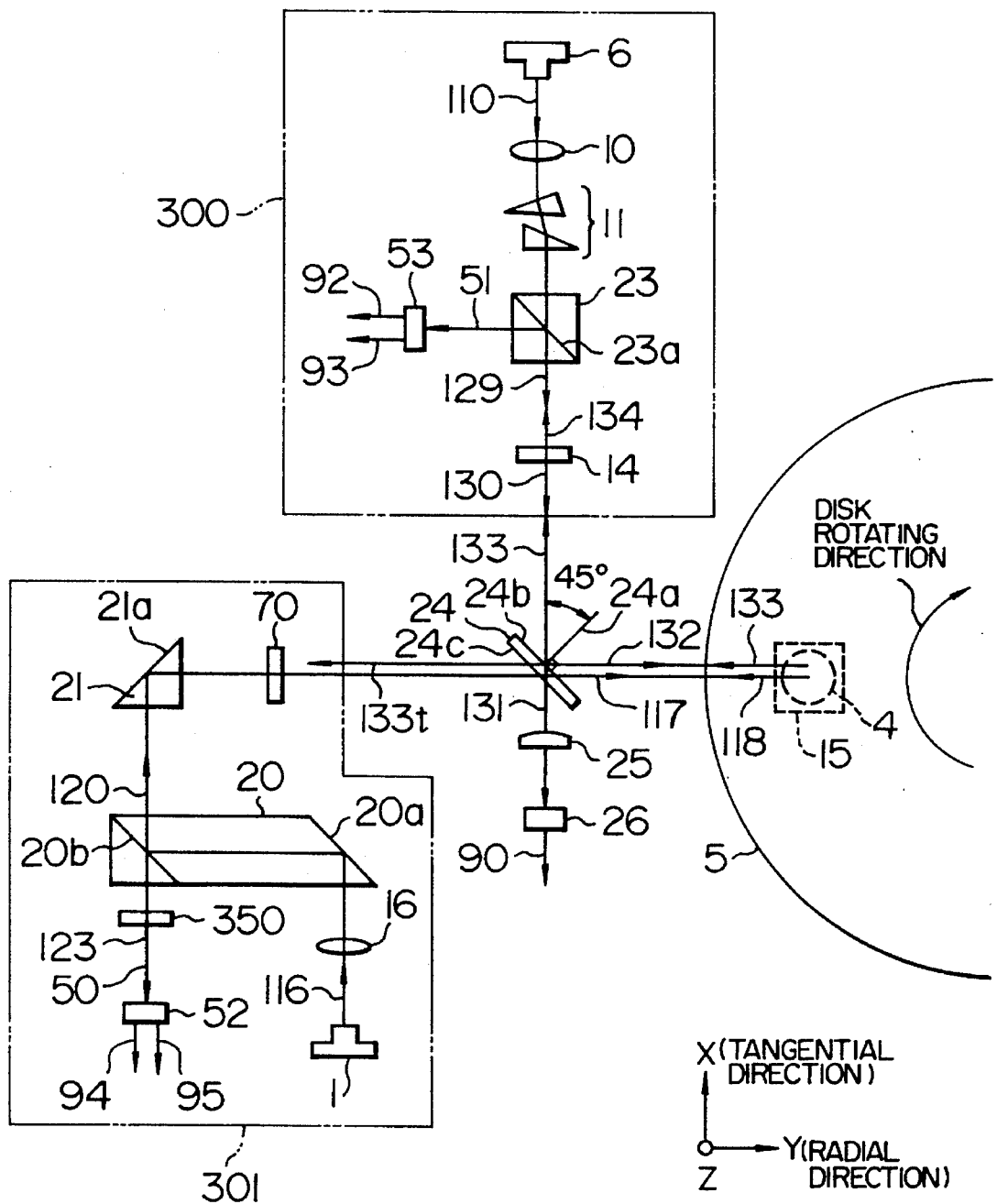
FIG. 12 is a constructional diagram showing the fifth embodiment of the invention.

The fifth embodiment of the invention is shown in FIG. 12. In FIG. 12, the component elements which can be regarded to be the same elements as those shown in FIG. 7 are designated by the same reference numerals. The embodiment relates to an example of a construction such that the reflectance for $\lambda_2$ (=780 nm) of the dichroism beam splitter 9 is changed from 1.0 to 0.9 and the intensity of the semiconductor laser device 6 is controlled by using the transmission light beam in the incident light beam.

In FIG. 12, the light beam 110 as a divergent light emitted from the semiconductor laser device 6 which serves as a linear polarization light source and in which the oscillation wavelength $\lambda_2$ is equal to 780 nm is converted into the parallel light beam by the colliminating lens 10. Anisotropy of an intensity of the parallel light beam is corrected by the beam shaping prisms 11. After that, the light beam is transmitted through a beam splitter 23 having a polarizing surface 23a which serves as light separating means and transmits the P polarization light and reflects the S polarization light. A parallel light beam 129 (P polarization) which was transmitted through the beam splitter 23 is converted into a circular polarization light 130 by the ¼ wavelength plate 14 and enters the dichroism beam splitter 24 having wavelength selectivity. The dichroism beam splitter 24 has optical characteristics such that a part of the incident light is transmitted and the remaining is reflected with respect to the wavelength $\lambda_1$ (=780 nm). In the embodiment, a light using ratio of a transmittance T=0.1 and a reflectance R=0.9 is obtained. Flat planes 24b and 24c are constructed by parallel flat plates and are arranged so that the angle between a normal vector 24a of the flat plane 24b (or flat plane 24c) and the incident light beam 130 is set to 45°. Since the phase difference $\delta_1$ of the wavelength $\lambda_1$ (=680 nm) by arranging the beam splitter 24 so as to have an incident angle 45° for the incident light beam has already been described in the construction of the third embodiment, explanation about the correction of the phase difference is omitted. Reference numeral 70 denotes a ½ wavelength plate and in the fifth embodiment, the direction of the polarization of the light beam 117 which enters the objective lens 4 is rotated by 90° as compared with that in the third embodiment. Due to this, as shown in FIG. 8, the light intensity of the reproducing spot 26 on the disk 5 is shown by an ellipse which is long in the radial direction of the optical disk 5 and its polarization is the linear polarization 70t in the tangential direction of the optical disk 5.

The light beam 130 which goes out from the ¼ wavelength plate 14 enters the dichroism beam splitter 24 and is divided into a transmission light beam 131 and a reflection light beam 132. The transmission light beam 131 is converged by a lens 25 and enters a photodetector 26. An output signal 90 of the photodetector 26 is used as a signal to control the light intensity of the semiconductor laser device 6.

The light beam 132 reflected by the dichroism beam splitter 24 is converged by the objective lens 4 through the mirror 15 and is irradiated (as a spot 25) onto the information recording surface 5a of the disk 5 to rewrite the information signal. The reflected light beam from the disk 5 is again converted into a parallel light beam 133 by the objective lens 4 and is reflected by the mirror 15 and the reflecting surface 24b of the dichroism beam splitter 24. After that, the reflected light again passes through the ¼ wavelength plate 14, so that the light beam is changed from the circular polarization light 133 to a light beam 134 as a linear polarization (S polarization) in which the polarizing direction of the light beam 129 as a linear polarization (P polarization) was rotated by 90°. The light beam 134 as an S polarization is reflected by the reflecting surface 23a of the beam splitter 23 and, after that, is led to the detection optical system 51 and enters the photodetector 53. Thus, the information signal 92 and the servo signal 93 are derived from the photodetector 53. Since the above point is not essentially concerned with the embodiment, its detailed description is omitted.

In the above construction, although the light intensity of the semiconductor laser device 6 has been controlled by using the light beam 131 which was transmitted through the beam splitter 24, the invention is not limited to such a construction. For example, it is also possible to reflect a part of the light beam (light beam 120 in the embodiment) of the reproducing optical system 301 which enters the beam splitter 24 and to control the light intensity of the semiconductor laser device 1 by using the reflected light. In the embodiment, when the light beam reflected from the disk 5 enters the dichroism beam splitter 24, a part (10% in the embodiment) of an incident light 133 enters the optical system 301. In the case where the light beam 133t causes a problem in the signal detection of the reproducing spot 26, it is necessary to shield the light beam 133t. For this purpose, a wavelength filter 350 is provided for the detection optical system 50 in the embodiment. The filter 350 can be also provided integratedly with a certain surface of the optical part.

In the above embodiment, the dichroism beam splitter 24 has been used at the incident angle of 45°, the invention is not limited to such a construction. In brief, it is sufficient to use a construction such that a light intensity of the semiconductor laser device is controlled by using a part of the light beam which entered the dichroism beam splitter. In the above construction, the light using ratio is not decreased by reducing the reflectance of the dichroism beam splitter 24. Namely, as compared with the P polarization transmittance of 0.9 of the beam splitter 7 (the first to fourth embodiments), the P polarization transmittance of the beam splitter 23 in the embodiment is equal to 1.0 and the whole light using ratio is not deteriorated.

Figure 13:
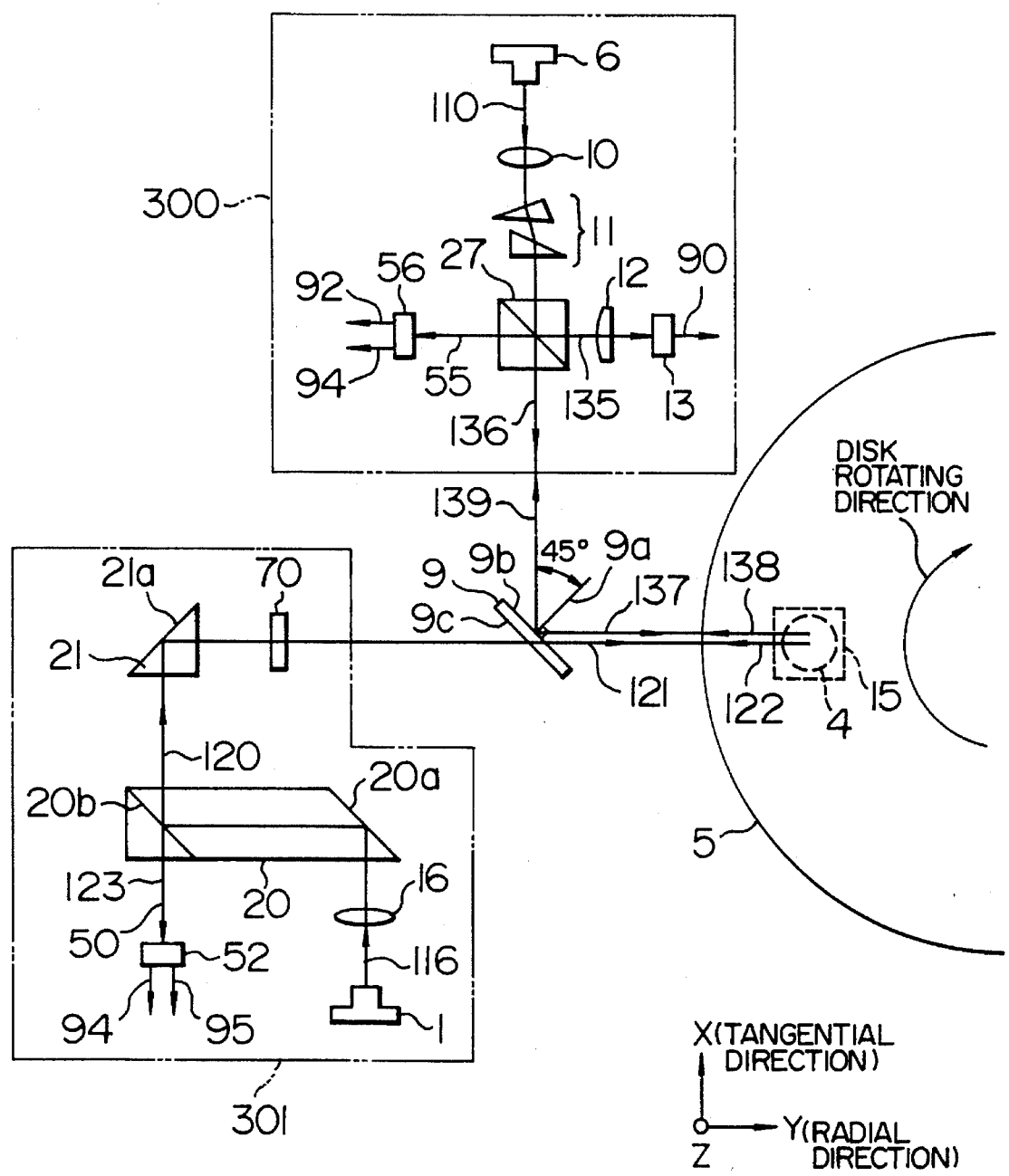
FIG. 13 is a constructional diagram showing the sixth embodiment of the invention.

FIG. 13 shows the sixth embodiment of the invention. In FIG. 13, the component elements which can be regarded as the same elements as those shown in FIG. 7 are designated by the same reference numerals. The sixth embodiment relates to an example of a construction in which the optical system 300 using the semiconductor laser device 6 can not only rewrite the information signal but also reproduce the magneto-optic signal. Since the reproducing optical system 301 using the semiconductor laser device 1 is similar to that shown in FIG. 7, its detailed description is omitted here.

The divergent light beam 110 emitted from the semiconductor laser device 6 which serves as a linear polarization light source and in which the oscillation wavelength $\lambda_1$ is equal to 780 nm is converted into the parallel beam by the collimating lens 10. Anisotropy of an intensity of the parallel light beam is corrected by the beam shaping prisms 11 and, after that, enters a beam splitter 27 as first light beam separating means and is divided into a transmission light beam 136 and a reflection light beam 135. The beam splitter 27 has polarizing characteristics such that reflectances and transmittances in the P polarization and the S polarization respectively differ, namely, for example, the P polarization transmittance $T_p$=0.7, the P polarization reflectance $R_p$=0.3, the S polarization transmittance $T_s$=0, and the S polarization reflectance $R_s$=1. The parallel light beam 135 reflected by the beam splitter 27 is converged by the lens 12 and enters the photodetector 13. The output signal 90 of the photodetector 13 is used as a signal to control the light intensity of the semiconductor laser device 6. Since such a point is not essentially concerned with the embodiment, its detailed description is omitted here.

On the other hand, the progressing direction of the parallel light beam 136 which was transmitted through the beam splitter 27 is deflected by 90° by the dichroism beam splitter 9 having the wavelength selectivity (in the embodiment, the light of the wavelength of 780 nm is reflected and the light of the wavelength of 680 nm is transmitted). The dichroism beam splitter 9 is constructed by the parallel flat plates having parallel flat surfaces 9b and 9c and is provided so that the angle between the normal vector 9a of the flat surface 9b (or flat surface 9c) and the incident light beam 136 is set to 45°. A light beam 137 reflected by the dichroism beam splitter 9 passes through the mirror 15 and is converged by the objective lens 4 and is irradiated (as a spot 25) onto the information recording surface 5a of the disk 5 in order to rewrite the information signal. The reflected light beam from the disk 5 is again converted into a parallel light beam 138 by the objective lens 4 and is reflected by the mirror 15 and the reflecting surface 9b of the dichroism beam splitter 9 and becomes a light beam 139. The light beam 139 is, further, reflected by a reflecting surface 27a of the beam splitter 27 and, after that, is led to a first detection optical system 55 and enters a photodetector 56. The information signal 94 as a magneto-optic signal and the servo signal 92 are derived from the photodetector 56.

In the embodiment, although the optical parts according to the detecting method of the servo signal 92 and the optical parts (analyzer and the like) according to the detecting method of the information signal 94 as a magneto-optic signal are obviously necessary, since they are not essentially concerned with the invention, they are omitted here. With respect to a method of correcting the phase difference $\delta_R$ which occurs upon reflection of the dichroism beam splitter 9, it is sufficient to use a method (means described in the first to fifth embodiments) of correcting the phase difference $\delta_1$ which occurs upon transmission of the dichroism beam splitter 9. Its detailed description is omitted here.

In the above 2-laser optical head, the optical system for detecting the magneto-optic signal has also been added to the optical system 300 which uses the semiconductor laser device 6 and is used to rewrite the magneto-optic signal. Thus, in case of reproducing information from the disk for a conventional one-laser optical head (wavelength of 780 nm), the light intensity of the semiconductor laser device 1 can be turned off. Namely, in the apparatus using the 2-laser optical head, there is an advantage such that an additional function is improved in terms of the compatibility with the conventional disk.

Figure 14:
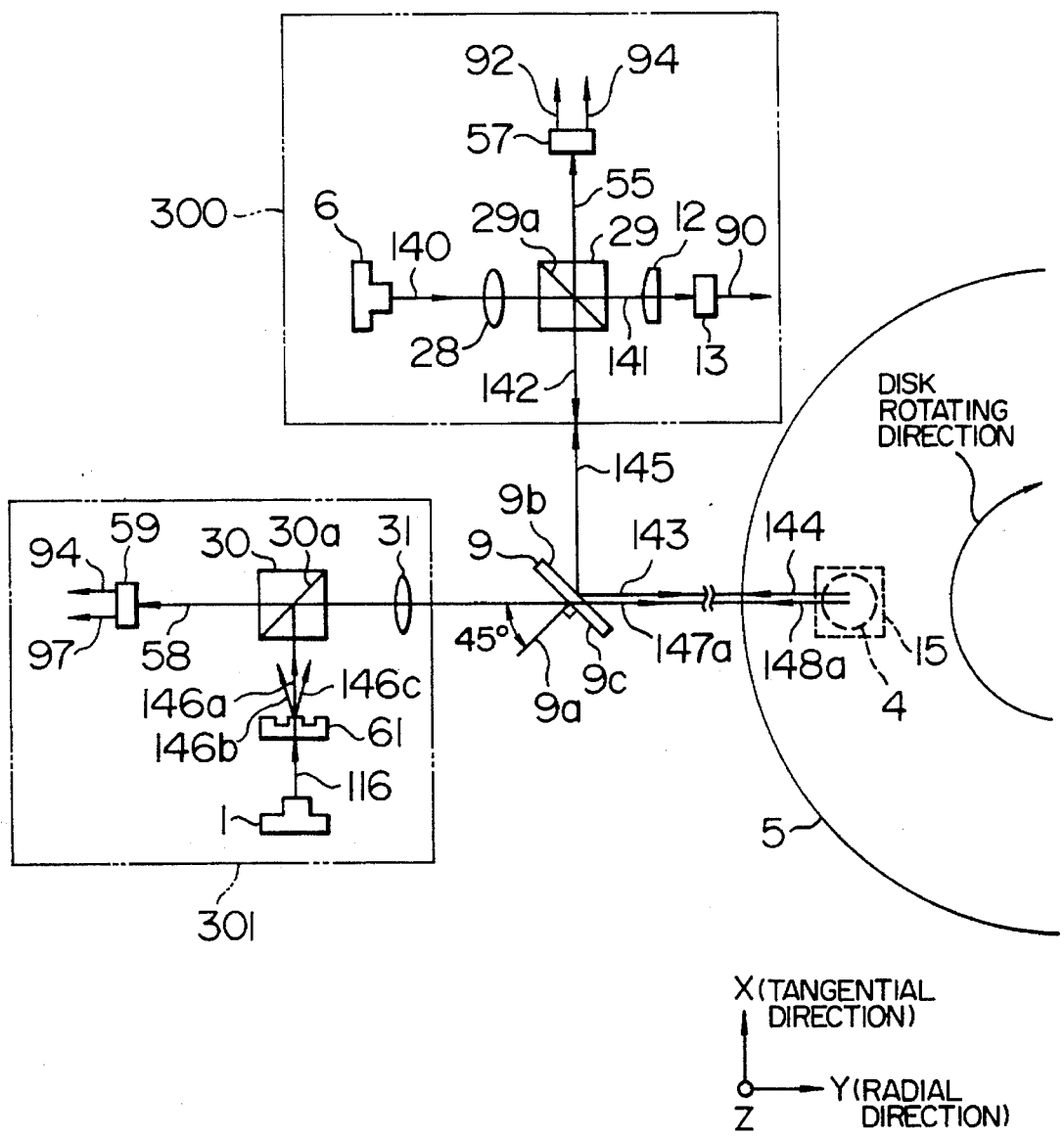
FIG. 14 is a constructional diagram showing the seventh embodiment of the invention.

FIG. 14 shows the seventh embodiment of the invention. In FIG. 14, the component elements which can be regarded to be the same elements as those shown in FIG. 13 are designated by the same reference numerals. The seventh embodiment relates to another embodiment of a construction in which the optical system 300 using the semiconductor laser device 6 can not only rewrite the signal but also reproduce the magneto-optic signal.

The divergent light beam 140 emitted from a semiconductor laser device 6 which serves as a linear polarization light source and in which the oscillation wavelength $\lambda_1$ is equal to 780 nm is converted into the parallel light beam by a collimating lens 28 and enters a beam splitter 29 as light beam separating means and is divided into a transmission light beam 141 and a reflection light beam 142. The beam splitter 29 has polarizing characteristics such that reflectances and transmittances in the P polarization and S polarization respectively differ, namely, for example, the P polarization transmittance $T_p=1.0$, the P polarization reflectance $R_p=0$, the S polarization transmittance $T_s=0.3$, and the S polarization reflectance $R_s=0.7$. The parallel light beam 141 which was transmitted through the beam splitter 29 is converged by the lens 12 and enters the photodetector 13. The output signal 90 of the photodetector 13 is used as a signal to control a light intensity of the semiconductor laser device 6. Since the above point is not essentially concerned with the embodiment, its detailed description is omitted here.

On the other hand, the progressing direction of the parallel light beam 142 which was reflected by the beam splitter 29 is deflected by 90° by the dichroism beam splitter 9 having wavelength selectivity (in the embodiment, the light of the wavelength of 780 nm is reflected and the light of 680 nm is transmitted). A light beam 143 reflected by the dichroism beam splitter 9 is converged by the objective lens 4 through the mirror 15 and is irradiated (as a spot 25) onto the information recording surface 5a of the disk 5 to rewrite the information signal. The reflected light beam from the disk 5 is again converted into a parallel light beam 144 by the objective lens 4. A light beam 145 reflected by the mirror 15 and the reflecting surface 9b of the dichroism beam splitter 9 is transmitted through the beam splitter 29 and is led to the first detection optical system 55 and enters a photodetector 57. The information signal 94 as a magneto-optic signal, the servo signal 92, and the like are derived from the photodetector 57. In the embodiment, although the optical parts according to the detecting method of the servo signal 92 and the optical parts (analyzer and the like) according to the detecting method of the information signal 94 as a magneto-optic signal are obviously necessary, since they are not essentially concerned with the invention, they are omitted.

On the other hand, the light beam 116 as a divergent light emitted from the semiconductor laser device 1 which serves as a linear polarization light source and in which the oscillation wavelength $\lambda_1$ is equal to 680 nm is diffracted to a main light beam 146a, a sub light beam 146b (+ primary light), and a sub light beam 146c (−primary light) by a diffraction grating 61 for a 3-spot method as one of the tracking detecting methods. Those light beams are respectively reflected by a reflecting surface 30a of a beam splitter 30 as second light beam separating means and are converted into parallel light beams by a collimating lens 31 after that and are transmitted through the dichroism beam splitter 9 provided so that the angle between the normal vector 9a of the flat plane 9c as an incident surface and the incident light beam 116 is set to 45°. The beam splitter 30 has polarizing characteristics such that reflectances and transmittances in the P polarization and S polarization respectively differ, namely, for example, the P polarization transmittance $T_p=1.0$, the P polarization reflectance $R_p=0$, the S polarization transmittance $T_s=0.3$, and the S polarization reflectance $R_s=0.7$. A transmission light beam 147a (sub light beams 147b, 147c are not shown) progresses almost in parallel with the light beam 143 reflected by the dichroism beam splitter 9 and is converged by the objective lens 4 as an achromatic lens through the mirror 15. The main light beam 147a is irradiated as a spot 26a (not shown) onto the information recording surface 5a of the disk 5. The sub light beams 147b and 147c are irradiated as spots 26b and 26c (not shown) onto the information recording surface 5a. The reflected light beam from the disk 5 is again converted into a parallel light beam 148a (sub light beams 148b and 148c are not shown) by the objective lens 4 and is reflected by the mirror 15. After that, the reflected light is transmitted through the dichroism beam splitter 9 and is, further, transmitted through the beam splitter 30 and is led to the second detection optical system 58 and enters the photodetector 59. The information signal 94 as a magneto-optic signal and a servo signal 97 to accurately position the spot 26a onto the information recording surface 5a are derived from the main light beam 148a and sub light beams 148b and 148c which entered the photodetector 59.

In the embodiment, in the servo signal 97, a tracking error signal using a 3-spot method is detected with respect to a tracking error detection. Although the optical parts such as a lens to converge the light beam to a photodetector 59 and the like and the analyzer and the like according to the detecting method of the information signal 94 as a magneto-optic signal are obviously necessary, since they are not essentially concerned with the invention, they are omitted here.

Figure 15:
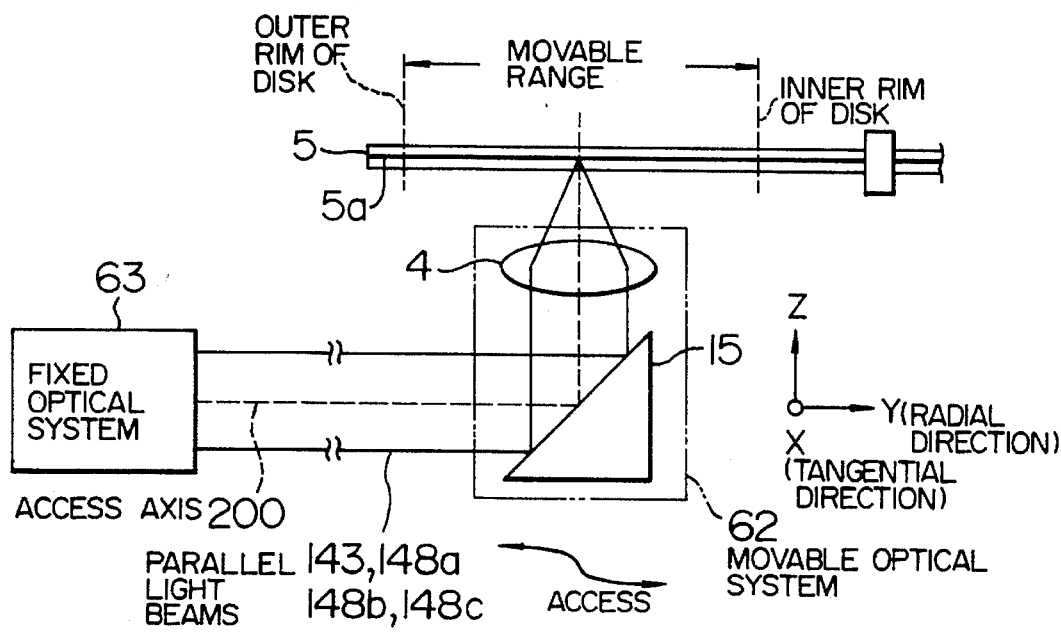
FIG. 15 is an explanatory diagram of a separation type optical head.
Figure 16:
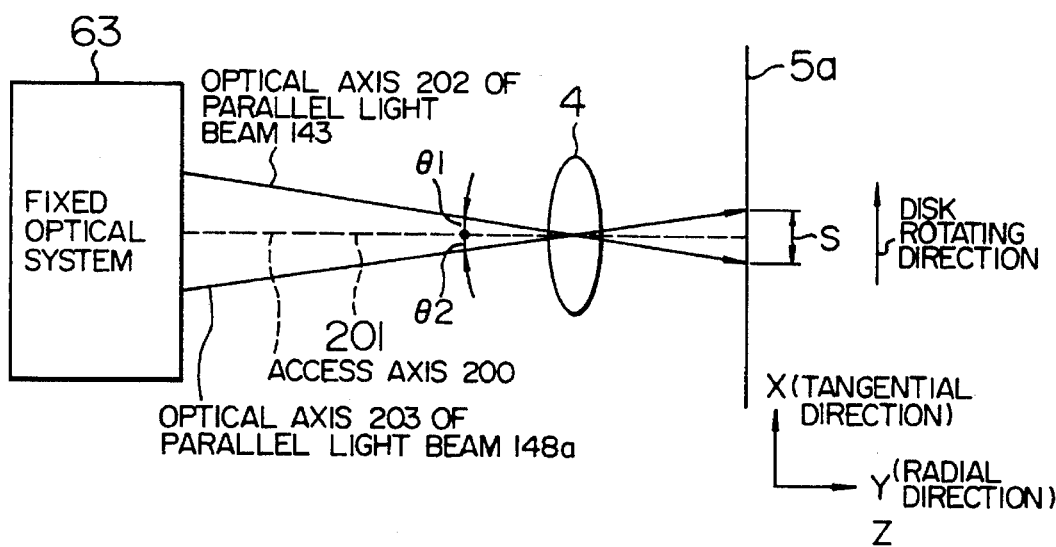
FIG. 16 is an explanatory diagram of a relative inclination of two optical axes.
Figure 17:
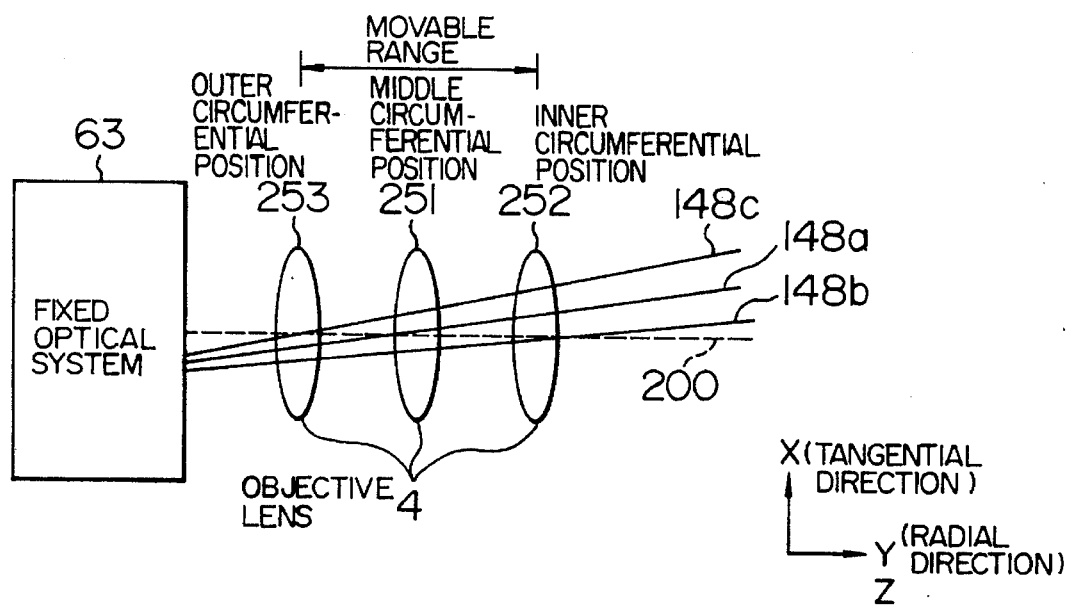
FIG. 17 is an explanatory diagram of inclinations of a main light beam and a sub light beam according to a 3-spot method.
Figure 18:
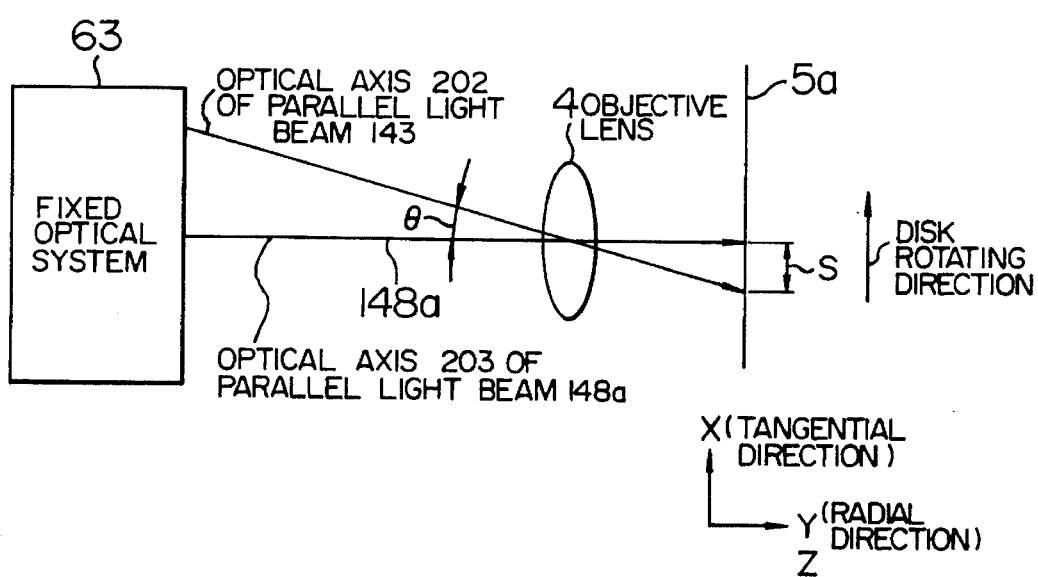
FIG. 18 is an explanatory diagram of a relative inclination of two optical axes in the 3-spot method.

Explanation will now be made with respect to the case of applying the 2-laser optical head having the above construction to a separation type optical head in which a movable optical system 62 on which only the objective lens 4 and mirror 15 as shown in FIG. 15 are installed is accessed in a movable range in the disk radial direction and the other optical parts and fixed (fixed optical system 63). In the separation type optical head, the movable optical system 62 is constructed so as to be movable on an access axis 200 which is parallel with the disk radial direction. In the 2-laser optical head, the spots 26 and 25 are irradiated onto an arbitrary same information track 5b of the disk so as to be away from each other by a predetermined interval S in the tangential direction. Therefore, the optical axes of the light beams 143 and 148a are mutually inclined (relative inclination angle θ). For example, when it is now assumed that the spot interval S is equal to 30 μm and the focal distance $f_1$ of the objective lens 4 is equal to 3.3 mm, the relative inclination angle θ is equal to 0.52°. As shown in FIG. 16, in the case where an optical axis 202 of the light beam 143 and an optical axis 203 of the light beam 148a are inclined by almost same angles for an axis 201 (which is parallel with the access axis 200) which passes through the center of the objective lens 4 ($θ_1≈θ_2=0.26°$), as shown in FIG. 17, in the separation type optical head, the position of the light beam which enters the objective lens 4 changes in the movable range. Generally, a diameter of each of the incident light beams 148a, 148b, and 148c is larger than the effective diameter ($2NA_1×f_1$) of the objective lens 4. However, since an intensity distribution of each of the incident light beams 148a, 148b, and 148c is a Gaussian distribution, an amount of light which enters the objective lens 4 fluctuates. Due to this, in case of using the 3-spot method for the tracking detection as in the embodiment, there is a problem such that, for example, even when an imbalance of the light amount was corrected by a gain adjustment or the like in the initial state at a middle circumferential position 251, since the movable optical system moves, a light amount imbalance occurs with respect to each of the sub light beams 148b and 148c, so that a tracking offset occurs. In the embodiment, accordingly, as shown in FIG. 18, the optical axis 203 of the main light beam 148a of the optical system (reproducing optical system 301 in the embodiment) using the 3-spot method is made coincident with the access axis 200. In this instance, the relative inclination angle θ of the two light beams (143, 148a) to obtain the spot interval S is inclined by only θ for the access axis 200. In the embodiment, consequently, $θ_1≈θ=0.52°$ and $θ_2≈0°$ in FIG. 16. It is also possible to use a construction such that $θ_2$ is set to a very small angle in consideration of a deterioration in image forming performance (increase in wave front aberration which occurs because the inclined light beam enters) of the objective lens 4.

By the above method, in case of using the 3-spot method in the tracking error detection, the light amount imbalance between the sublight beams 148b and 148c due to the movement of the movable optical system can be reduced and the problem of the occurrence of a tracking offset can be solved.

Figure 19:
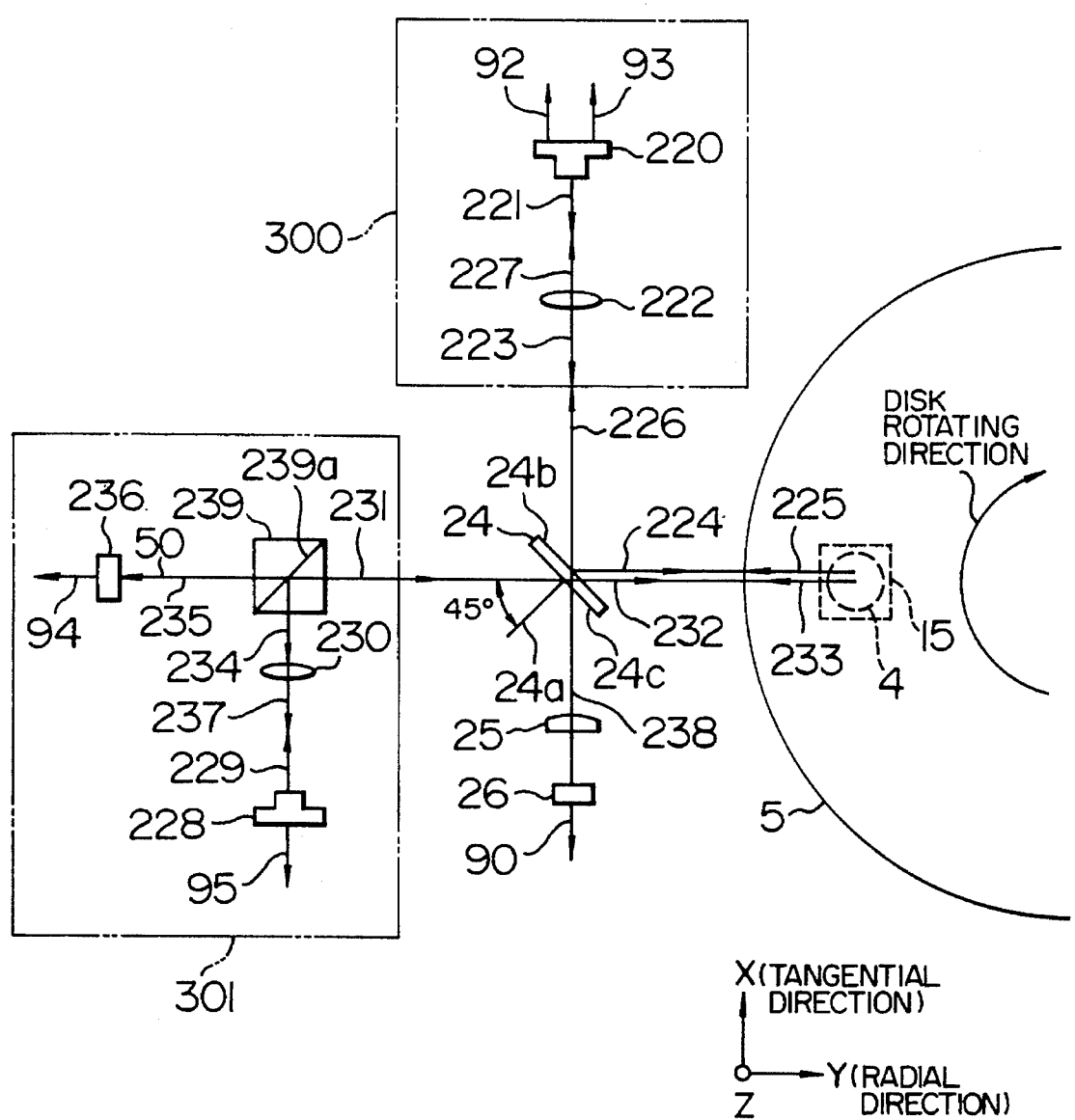
FIG. 19 is a constructional diagram showing the eighth embodiment of the invention.

FIG. 19 shows the eighth embodiment of the invention. A 2-laser optical head of the embodiment relates to a construction using the dichroism beam splitter. A semiconductor laser 220 which is used in the optical system 300 for rewriting the information signal and a semiconductor laser 228 which is used in the reproducing optical system 301 (both of the semiconductor lasers 220 and 228 are used in the embodiment) have a construction in which optical means for detecting the servo signal is built in the casing. In FIG. 19, the component elements which can be regarded to be the same elements as those shown in FIG. 1 are designated by the same reference numerals.

A light beam 229 as a divergent light emitted from the semiconductor laser 228 having the semiconductor laser device 1 which serves as a linear polarization light source and in which the oscillating wavelength $λ_1$ is equal to 680 nm is converted into a parallel light beam 231 by a collimating lens 230 and is reflected by a reflecting surface 239a of a beam splitter 239 as light beam separating means. The light beam 231 reflected by the beam splitter 239 is transmitted through a dichroism beam splitter 24 and becomes a light beam 232 and is converged by the objective lens 4 as an achromatic lens through the mirror 15 and is irradiated (as a spot 26) onto the information recording surface 5a of the disk 5.

The reflected light beam from the disk 5 is again converted into a parallel light beam 233 by the objective lens 4 and is reflected by the mirror 15. After that, the reflected light is transmitted through the dichroism beam splitter 24 and is divided into a transmission light 235 and a reflection light 234 by the beam splitter 239. The transmission light 235 is led to the detection optical system 50 and enters a photodetector 236. The information signal 94 as a magneto-optic signal is derived from the light beam 235 which entered the photodetector 236. On the other hand, the parallel light beam 234 reflected by the reflecting surface 239a of the beam splitter 239 is again converged into a convergence light beam 237 by the collimating lens 230 and enters the semiconductor laser 228, and the servo signal 95 is derived after that. Detailed descriptions of the optical parts arranged in the semiconductor laser to detect the servo signal 95 and its arrangement are omitted here.

A light beam 221 as a divergent light emitted from the semiconductor laser 220 having the semiconductor laser device 6 which serves as a linear polarization light source and in which the oscillation wavelength $λ_2$ is equal to 780 nm is converted into a parallel light beam 223 by a collimating lens 222 and enters the dichroism beam splitter 24 having the wavelength selectivity described in FIG. 12. The dichroism beam splitter 24 has optical characteristics such that a part of the incident light is transmitted and the remaining light is reflected with respect to the wavelength $λ_1$ (=780 nm). The incident light beam 223 enters the dichroism beam splitter 24 and is divided into a transmission light beam 238 and a reflection light beam 224. The transmission light beam 238 is converged by the lens 25 and enters the photodetector 26. The output signal 90 of the photodetector 26 is used as a signal to control the light intensity of the semiconductor laser device 6.

On the other hand, the light beam 224 reflected by the dichroism beam splitter 24 is converged by the objective lens 4 through the mirror 15 and is irradiated (as a spot 25) onto the information recording surface 5a of the disk 5 to rewrite the information signal. The reflected light beam from the disk 5 is again converted into a parallel light beam 225 by the objective lens 4 and is reflected by the mirror 15 and the reflecting surface 24b of the dichroism beam splitter 24 and becomes a parallel light beam 226. The parallel light beam 226 is converged into a convergence light beam 227 by the collimating lens 222 and enters the semiconductor laser 220. After that, the information signal 93 and the servo signal 92 are derived. A detailed description about the optical parts arranged in the semiconductor laser 220 to detect the servo signal 92 and its arrangement is omitted here.

By using the 2-laser optical head with the above construction, the optical head can be miniaturized.

Figure 20:
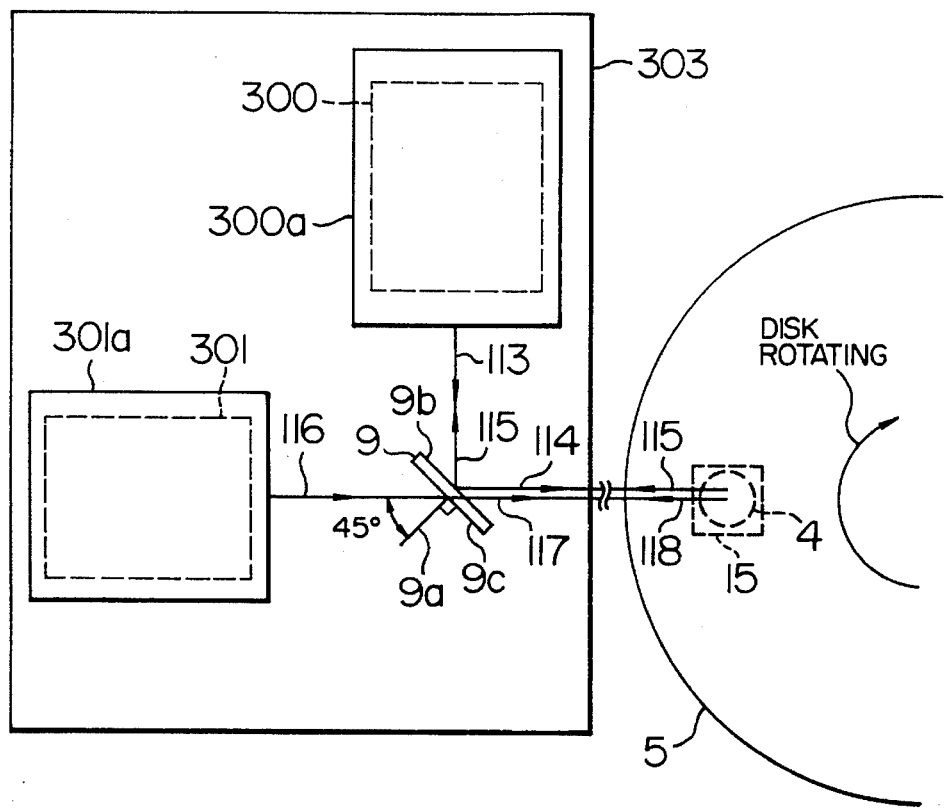
FIG. 20 is a constructional diagram showing the ninth embodiment of the invention.

FIG. 20 shows the ninth embodiment of the invention. A 2-laser optical head of the embodiment relates to a construction using a dichroism beam splitter. In FIG. 20, the component elements which can be regarded to be the same elements as those shown in FIG. 1 are designated by the same reference numerals.

The 2-laser optical head of the ninth embodiment doesn't have a construction such that all of the optical parts are arranged on the same optical base but has a construction such that an optical base 300a having the optical system 300 to rewrite the information signal, an optical base 301a having the optical system 301 to reproduce the information signal, and an optical base 303 having the dichroism beam splitter 9 are independent and that the optical bases 300a and 301a are attached to the optical base 303. According to the above construction, the inclination between the optical axes to obtain the spot interval S described in FIG. 16 doesn't need to be obtained by the movement of the optical parts (semiconductor laser and the like). It is sufficient to incline the whole optical base. Therefore, the adjustment and attachment of the optical parts are simplified. The optical adjustment which causes a problem in the separation type optical head or the like can be also executed by the position adjustment of the optical base.

Although the three optical bases 300a, 301a, and 303 have been used in the above embodiment, the invention is not limited to such a construction. For instance, the optical base 300a having the optical system 300 to rewrite the information signal and the optical base 303 having the dichroism beam splitter 9 can be also constructed by the same two optical bases.

Figure 21:
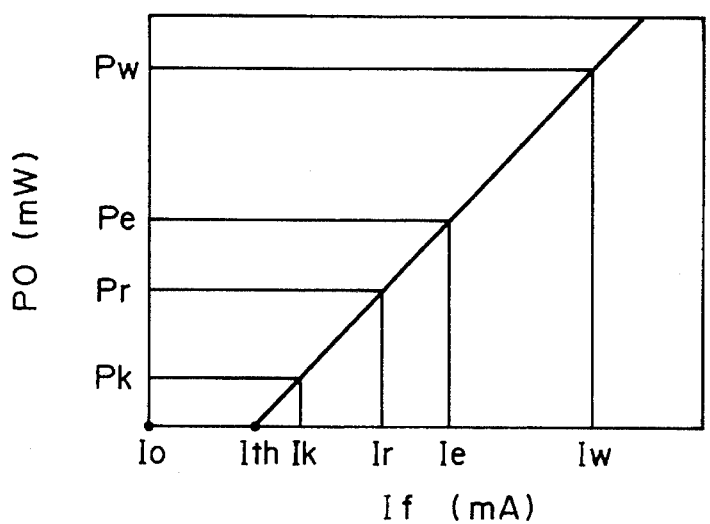
FIG. 21 is a diagram showing an embodiment of control of a laser beam intensity.

An embodiment of a control method of a light emission intensity of the semiconductor laser device 6 of the invention will now be described with reference to FIG. 21. The embodiment relates to a case of rewriting information by a light intensity modulation. FIG. 21 shows a driving current $I_f$ which is required for light emission of the semiconductor laser 6 and a light emission intensity $P_o$ corresponding to such a driving current. Since the semiconductor laser device 6 is used to rewrite information, the light emission intensity is set to three stages as shown in the diagram: that is, a reproducing state $P_r$ (state in which the servo signal or the like is detected although the information signal is not rewritten), an erasing state $P_e$ (state in which the information signal has been rewritten: low output state), and a recording state $P_w$ (state in which the information signal has been rewritten: high output state). However, in the above 2-laser optical head, in case of driving only the reproducing optical system, hitherto, the driving current $I_f$ of the semiconductor laser 6 is set into a light emission stop state $I_o$. Therefore, for example, in case of instantaneously rewriting the information signal, the driving current $I_f$ of the semiconductor laser device 6 needs to be instantaneously switched from $I_o$ to the current corresponding to the light emission intensity of the semiconductor laser device 6. However, since there is also a delay of the response in association with the current switching, there is a problem such that to actually start to write the information, it takes a certain time including such a response delay as well. In the 2-laser optical head of the embodiment, in the case where the optical system 300 for rewriting is in a standby state, a light emission intensity P of the semiconductor laser device 6 is set to $P_k$ that is equal to or less than $P_r$ in the reproducing state and is equal to or larger than a threshold value $I_{th}$ at which the laser light emission starts. Consequently, the rewriting optical system 300 can instantaneously start to rewrite the information from the standby state.

Figure 22:
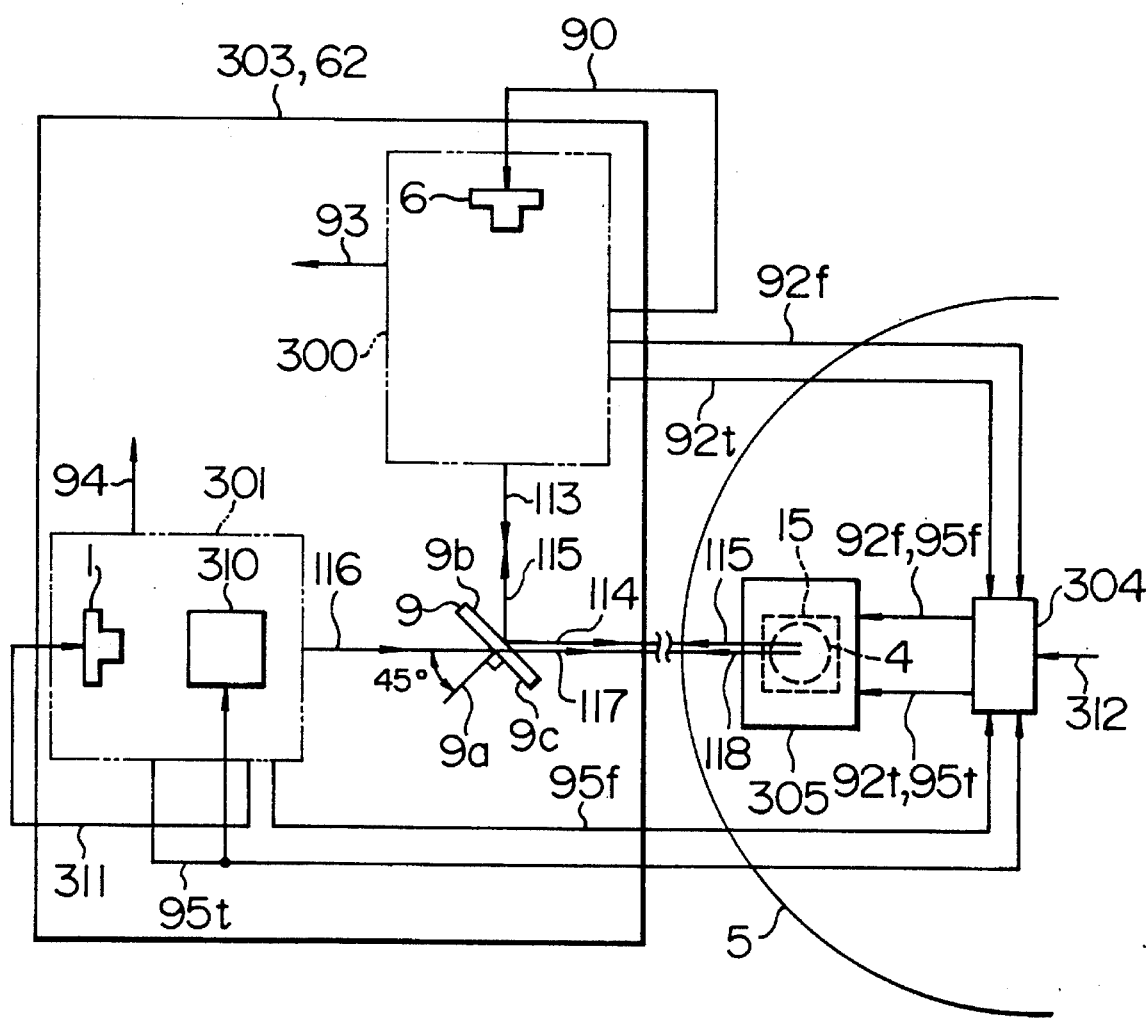
FIG. 22 is a constructional diagram showing the tenth embodiment of the invention.

A construction of a recording/reproducing apparatus using the 2-laser optical head of the invention will now be described with reference to FIG. 22.

In the 2-laser optical head described in detail above, the rewriting spot 25 is accurately positioned onto the information recording surface 5a of the disk 5 by driving a 2-dimensional actuator 305 for two-dimensionally moving the objective lens 4 in both of a focusing direction Z and a tracking direction Y by using the servo signal 92 (focusing error signal 92f, tracking error signal 92t) which is detected from the optical system 300.

On the other hand, the reproducing spot 26 is positioned onto the same track 5b as that of the rewriting spot 25 by driving light beam polarizing means 310 provided in the optical system 301 by using a tracking error signal 95t in the servo signal 95 (focusing error signal 95f, tracking error signal 95t) which is detected from the optical system 301. With respect to the positioning in the focusing direction (the reproducing spot 26 is focused onto the recording surface 5a of the disk 5), upon initial adjustment, the position is adjusted so that the in-focus point coincides with the rewriting spot 25 and, upon operation, the in-focus point traces the rewriting spot 25. The light beam polarizing means 310 is optical means for changing the inclination of the light beam which enters the objective lens 4 to move the spot 26 in the radial direction. Although there is a construction using a mirror (which is used for reflection) and a prism (which is used for transmission) and the like, its detailed description is omitted because they are not essentially concerned with the invention.

In the above construction, the optical system to control the 2-dimensional actuator 305 is set to the main control system and the optical system to control the light beam polarizing means 310 is set to the sub control system. It is sufficient that the sub control system is an optical system for detecting only the tracking error signal 95t to control the light beam polarizing means 310 as a servo signal 95. In the embodiment, however, the focusing error signal 95f is also detected.

In the above construction, in case of rewriting information, the main control system to control the 2-dimensional actuator 305 is set to the optical system 300 for rewriting information. In case of performing only the reproduction of information, the main control system to control the 2-dimensional actuator 305 can be set to the optical system 300 for rewriting information or can be also switched to the optical system 301 for reproduction. That is, as for the main control system to control the 2-dimensional actuator 305, the signal to control the 2-dimensional actuator 305 is switched from the servo signal 92 (92f, 92t) to the servo signal 95 (95f, 95t) by a switching circuit 304 by a switching signal 312. At this time, for example, it is also possible to construct in a manner such that by using mechanical means or by additionally providing a sensor to detect a displacement of the light beam polarizing means 310, the displacement of the light beam polarizing means 310 is detected and a feedback control is performed so as to electrically set the displacement to zero, thereby preventing that the emitted light beam is deflected. Or, by using mechanical means of the 2-dimensional actuator 305 or by providing a sensor to detect a displacement in the tracking direction of the 2-dimensional actuator 305, a displacement in the tracking direction of the actuator 305 is detected from an output of the sensor, a feedback control is executed so as to electrically set the displacement to zero, thereby preventing that the actuator 305 moves in the tracking direction. The position of the spot in the tracking direction can be also controlled by using the light beam polarizing means 310.

The above construction has a feature such that the two optical systems have optical systems each for detecting the focusing error signal and the tracking error signal and the signal to control the 2-dimensional actuator 305 is switched. In the embodiment, a part of the light beam emitted from the semiconductor laser device 1 is detected and a control signal 311 is obtained and the light emission intensity of the semiconductor laser device 1 can be also controlled by using the signal 311.

The invention has been described in detail above by using the drawings. In the embodiment, although the dichroism beam splitter has a construction such that the optical system of a short wavelength ($\lambda_1$=680 nm) has been used for transmission, it can be also used for reflection. On the other hand, although the main control has been performed by the optical system 301 for rewriting the signal. It can be also performed by the optical system 300 for reproduction. Although the dichroism beam splitter has daringly been used at the incident angle of 45° the incident angle can be also set to a value other than 45°.

In the above embodiment, the magneto-optic information recording medium, in other words, the magneto-optic disk has been described as an example of an information recording medium. However, an optical information recording medium, in other words, an optical disk can be also used.

As will be obviously understood from the above description, according to the invention in a 2-laser optical head comprising: the first and second optical systems in which lights are emitted from the first and second semiconductor lasers and are led to the information recording medium side and the reflected lights from the recording surface of the lights irradiated are respectively detected through the first and second detecting means; the beam splitter for separating and combining the two optical systems; and the objective lens for converging the first and second laser beams emitted from the first and second semiconductor lasers and irradiating onto the recording surface of the information recording medium, and for forming the first and second spots, wherein the optical correcting means for correcting the phase difference of the beam splitter is provided, the optical deterioration can be corrected by the optical correcting means. Therefore, even when the beam splitter is arranged at an angle of 45° for the incident light beam, the good information signal can be obtained without causing a deterioration of the information signal. On the other hand, since the optical axes in the two optical systems can be constructed perpendicularly or in parallel with each other, the optical parts can be simply arranged and the optical head can be easily manufactured. Thus, the small 2-laser optical head can be provided at low costs.

Further, by using the 2-laser optical head with such a construction to the recording/reproducing apparatus, the optical parts can be simply arranged and the small recording/reproducing apparatus can be provided at low costs.

What is claimed is:

1. A two-laser optical head comprising:

a first optical system for emitting a first laser beam having a first wave length ($\lambda_1$), said first laser beam goes through a first optical path to irradiate an information recording medium and reflected thereon and return through said first optical path to be detected by first detecting means, said first optical system reproduces an information signal on said medium;

a second optical system for emitting a second laser beam having a second wave length ($\lambda_2$), said second laser beam goes through a second optical path to irradiate an information recording medium and reflected thereon and return through said second optical system, said second optical system at least erases and records an information signal on said medium;

a beam splitter disposed both on said first and second optical paths for separating and combining said first optical system, and said second optical system said first laser beam and reflected first laser beam pass through said beam splitter, said second laser beam and reflected second laser beam are reflected by said beam splitter;

an objective lens for converging said first laser beam and said second laser beam onto said information recording medium to form a first spot and a second spot, respectively; and means disposed on at least one of said first and second optical paths for correcting a phase difference of said beam splitter.

2. A head according to claim 1, wherein said means for correcting a phase difference comprises another beam splitter which is provided separately from said beam splitter having the same polarizing characteristics as those of said beam splitter.

3. A head according to claim 2, wherein said information recording medium is a magneto-optic disk, oscillation wavelengths of said first and second semiconductor laser devices are different, and both of said beam splitters have wavelength selectivity.

4. A head according to claim 1, wherein said means for correcting a phase difference comprises a total reflecting mirror for deflecting an optical path.

5. A head according to claim 1, wherein said optical correcting means comprises a birefringence medium.

6. A head according to claim 1, wherein said optical correcting means comprises a ¼ wavelength plate and corrects a phase difference of said beam splitter by rotating an azimuth angle of an optical axis of said ¼ wavelength plate.

7. A head according to claim 1, wherein said means for correcting a phase difference comprises a first light beam separating means for separating the first reflection light to a first detection optical system and second light beam separating means for separating the second reflection light into a second detection optical system.

8. A head according to claim 1, wherein said beam splitter comprises a parallel flat plate and is arranged in a manner such that an angle between a normal vector of said parallel flat plate and the first laser beam emitted from said first semiconductor laser device is equal to about 45°.

9. A two-laser optical head comprising:

a first optical system for emitting a first laser beam having a first wave length ($\lambda_1$), said first laser beam irradiates an information recording medium and reflected thereon to be detected by first detecting means, said first optical system reproduces an information signal on said medium;

a second optical system for emitting a second laser beam having a second wave length ($\lambda_2$), said second laser beam irradiates an information recording medium and reflected thereon to be detected by second detecting means, said second optical system at least erases and records an information signal on said medium;

a first beam splitter for separating and combining said first optical system and said second optical system, said first laser beam passes through said first beam splitter and said second laser beam is reflected by said first beam splitter;

an objective lens for converging said first laser beam and said second laser beam onto said information recording medium to form a first spot and a second spot, respectively; and a second beam splitter disposed on a beam path between a beam source and said first beam splitter in said first optical system said second beam splitter corrects phase difference in said first laser beam caused by said first beam splitter.

wherein said first laser beam passes through said second beam splitter and thereafter passes through said first beam splitter twice and thereafter is reflected by said second beam splitter to be led to said first detecting means.

* * * * *

UNITED STATES PATENT AND TRADEMARK OFFICE
CERTIFICATE OF CORRECTION

PATENT NO. : 5,493,554

DATED : 20 February 1996

INVENTOR(S) : Tooru SASAKI et al.

Page 1 of 8

It is certified that error appears in the above-identified patent and that said Letters Patent is hereby corrected as shown below:

<u>IN THE ABSTRACT</u>: Line 16: Change "dichroism" to --dichroic--.
Line 18: After "axes" delete "and".

| <u>Column</u> | <u>Line</u> | |
|---|---|---|
| 1 | 14 | Change "is" to --are--. |
| 1 | 31 | Change "dichroism" to --dichroic--. |
| 1 | 34 | Change "needs to keep" to --need to maintain--. |
| 1 | 53 | Change "dichroism" to --dichroic--. |
| 1 | 55 | Change "is" to --be--. |
| 2 | 16 | Change "dichroism" to --dichroic--. |
| 2 | 37 | Change "dichroism" to --dichroic--. |

UNITED STATES PATENT AND TRADEMARK OFFICE
CERTIFICATE OF CORRECTION

PATENT NO. : 5,493,554

DATED : 20 February 1996

INVENTOR(S) : Tooru SASAKI et al.

It is certified that error appears in the above-identified patent and that said Letters Patent is hereby corrected as shown below:

| Column | Line | |
|---|---|---|
| 2 | 66 | Delete "while". |
| 2 | 67 | Change "by" to --in--. |
| 3 | 32 | Change "dichroism" to --dichroic--. |
| 3 | 35 | After "101" insert --transmitted--. |
| 3 | 35 | Change "dichroism" to --dichroic--. |
| 3 | 42 | Change "dichroism" to --dichroic--. |
| 3 | 49 | Change "dichroism" to --dichroic--. |
| 3 | 55 | Change "dichroism" to --dichroic--. |
| 3 | 58 | Change "dichroism" to --dichroic--; change "into" to --to--. |

UNITED STATES PATENT AND TRADEMARK OFFICE
CERTIFICATE OF CORRECTION

PATENT NO. : 5,493,554  Page 3 of 8
DATED : 20 February 1996
INVENTOR(S) : Tooru SASAKI et al.

It is certified that error appears in the above-identified patent and that said Letters Patent is hereby corrected as shown below:

| Column | Line | |
|---|---|---|
| 5 | 40 | Change "be preceding to" to --precede--. |
| 6 | 4 | Change "dichroism" to --dichroic--. |
| 6 | 59 | Change "dichroism" to --dichroic--. |
| 6 | 66 | Change "dichroism" to --dichroic--. |
| 7 | 22 | Change "dichroism" to --dichroic--. |
| 7 | 24 | Change "dichroism" to --dichroic--. |
| 7 | 25 | Change "dichroism" to --dichroic--. |
| 7 | 50 | Change "dichroism" to --dichroic--. |
| 7 | 64-65 | Change "dichroism" to --dichroic--. |

UNITED STATES PATENT AND TRADEMARK OFFICE
CERTIFICATE OF CORRECTION

PATENT NO. : 5,493,554

DATED : 20 February 1996

INVENTOR(S) : Tooru SASAKI et al.

It is certified that error appears in the above-identified patent and that said Letters Patent is hereby corrected as shown below:

| Column | Line | |
|---|---|---|
| 8 | 8 | Change "dichroism" to --dichroic--. |
| 8 | 27 | Change "dichroism" to --dichroic--. |
| 8 | 32 | Change "in stead" to --instead--. |
| 8 | 34 | Change "dichroism" to --dichroic--. |
| 8 | 35 | Change "dichroism" to --dichroic--. |
| 8 | 39 | Change "dichroism" to --dichroic--. |
| 8 | 58 | Change "dichroism" to --dichroic--. |
| 9 | 12 | Change "differs" to --differ--. |
| 9 | 19 | Change "dichroism" to --dichroic--. |
| 9 | 30 | Change "dichroism" to --dichroic--. |

UNITED STATES PATENT AND TRADEMARK OFFICE
CERTIFICATE OF CORRECTION

PATENT NO. : 5,493,554

DATED : 20 February 1996

INVENTOR(S) : Tooru SASAKI et al.

It is certified that error appears in the above-identified patent and that said Letters Patent is hereby corrected as shown below:

| Column | Line | |
|--------|------|---|
| 9  | 42 | Change "dichroism" to --dichroic--. |
| 10 | 11 | delete "in order". |
| 10 | 15 | Change "an almost circle" to --almost a circle--. |
| 10 | 21 | Change "dichroism" to --dichroic--. |
| 12 | 15 | After "progresses" delete "in". |
| 12 | 16 | Change "dichroism" to --dichroic--. |
| 12 | 39 | Change "dichroism" to --dichroic--. |
| 12 | 43 | Change "dichroism" to --dichroic--. |
| 12 | 56 | Change "dichroism" to --dichroic--. |
| 12 | 66 | Change "dichroism" to --dichroic--. |

UNITED STATES PATENT AND TRADEMARK OFFICE
CERTIFICATE OF CORRECTION

PATENT NO. : 5,493,554

DATED : 20 February 1996

INVENTOR(S) : Tooru SASAKI et al.

It is certified that error appears in the above-identified patent and that said Letters Patent is hereby corrected as shown below:

| Column | Line | |
|--------|------|---|
| 13 | 17 | Change "dichroism" to --dichroic--. |
| 13 | 40 | Change "dichroism" to --dichroic--. |
| 13 | 54 | Change "dichroism" to --dichroic--. |
| 14 | 11 | Change "dichroism" to --dichroic--. |
| 14 | 26 | Change "dichroism" to --dichroic--. |
| 16 | 10 | Change "dichroism" to --dichroic--. |
| 16 | 17 | Change "dichroism" to --dichroic--. |
| 16 | 38 | Change "dichroism" to --dichroic--. |
| 16 | 49 | Change "dichroism" to --dichroic--. |
| 16 | 60 | Change "dichroism" to --dichroic--. |

UNITED STATES PATENT AND TRADEMARK OFFICE
CERTIFICATE OF CORRECTION

PATENT NO. : 5,493,554
DATED : 20 February 1996
INVENTOR(S) : Tooru SASAKI et al.

It is certified that error appears in the above-identified patent and that said Letters Patent is hereby corrected as shown below:

| Column | Line | |
|---|---|---|
| 18 | 3  | Change "dichroism" to --dichroic--. |
| 18 | 28 | Change "dichroism" to --dichroic--. |
| 18 | 48 | Change "dichroism" to --dichroic--. |
| 18 | 67 | Change "dichroism" to --dichroic--. |
| 19 | 13 | Change "dichroism" to --dichroic--. |
| 19 | 23 | Change "dichroism" to --dichroic--. |
| 19 | 41 | Change "dichroism" to --dichroic--. |
| 21 | 23 | Change "dichroism" to --dichroic--. |
| 21 | 30 | Change "dichroism" to --dichroic--; |
| 21 | 65 | Change "to" to --for--. |
| 21 | 66 | Change "the" to --a--. |

UNITED STATES PATENT AND TRADEMARK OFFICE
CERTIFICATE OF CORRECTION

PATENT NO. : 5,493,554
DATED : 20 February 1996
INVENTOR(S) : Tooru SASAKI et al.

It is certified that error appears in the above-identified patent and that said Letters Patent is hereby corrected as shown below:

| Column | Line | |
|--------|------|---|
| 22 | 6 | Before "reflected" insert --is--; change "return" to --returns--. |
| 22 | 13 | Before "reflected" insert --is--. |
| 22 | 14 | Change "return" to --returns--. |
| 22 | 19 | After "system" (first occurrence) delete ","; after "system" (second occurrence) insert --;--. |
| 22 | 64 | Before "reflected" insert --is--. |
| 23 | 4 | Before "reflected" insert --is--. |
| 24 | 5 | After "system" insert --,--. |

Signed and Sealed this

Sixth Day of August, 1996

Attest:

*Attesting Officer*

BRUCE LEHMAN
*Commissioner of Patents and Trademarks*